US006430215B1

United States Patent
Kinoshita et al.

(10) Patent No.: US 6,430,215 B1
(45) Date of Patent: *Aug. 6, 2002

(54) SPREAD SPECTRUM RADIO TRANSMISSION DIGITAL MOBILE COMMUNICATION DEVICE

(75) Inventors: Norihito Kinoshita, Yokohama; Kazuyuki Miya, Kawasaki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,365

(22) Filed: May 23, 2000

Related U.S. Application Data

(63) Continuation of application No. 08/836,404, filed as application No. PCT/JP96/02493 on Sep. 4, 1996, now Pat. No. 6,128,333.

(30) Foreign Application Priority Data

Sep. 4, 1995 (JP) .............................................. 7-248296

(51) Int. Cl.⁷ ........................... H04L 27/30; H61F 2/06; H04B 1/06; H04B 7/00
(52) U.S. Cl. ........................ 375/147; 342/380; 455/273
(58) Field of Search ........................ 375/147; 342/283, 342/380; 455/273

(56) References Cited

U.S. PATENT DOCUMENTS

| | | | |
|---|---|---|---|
| 4,268,829 A | | 5/1981 | Baurle et al. |
| 5,218,359 A | * | 6/1993 | Minamisono ............... 342/383 |
| 5,224,122 A | | 6/1993 | Bruckert |
| 5,369,412 A | * | 11/1994 | Tsujimoto ................... 342/380 |
| 5,422,909 A | | 6/1995 | Love et al. |
| 5,768,698 A | * | 6/1998 | Kinoshita ................... 455/273 |
| 5,978,413 A | * | 11/1999 | Bender ........................ 375/206 |
| 6,128,333 A | * | 10/2000 | Kinoshita et al. ........... 375/147 |

FOREIGN PATENT DOCUMENTS

| | | |
|---|---|---|
| JP | 2-90743 | 3/1990 |
| JP | 2-149022 | 6/1990 |
| JP | 3-35622 | 2/1991 |
| JP | 7-74685 | 3/1995 |
| JP | 7-74687 | 3/1995 |
| JP | 7-231278 | 8/1995 |
| JP | 8-274687 | 10/1996 |

* cited by examiner

Primary Examiner—Chi Pham
Assistant Examiner—Tony Al-Beshrawl
(74) Attorney, Agent, or Firm—McDermott, Will & Emery

(57) ABSTRACT

A spread spectrum radio transmission digital mobile communication device having RAKE receiving functions. By adding an arrangement of an adaptive antenna to control directivity of a receiving antenna to the spread spectrum radio transmission digital mobile communication device, it is possible to decrease influence of a co-channel interference wave and influence of a delay wave having a delay time smaller than chip time width in a diffusion signal, as not achievable by RAKE receiving functions.

19 Claims, 22 Drawing Sheets

FIG. 12

SPREAD SPECTRUM RADIO TRANSMISSION DIGITAL MOBILE COMMUNICATION DEVICE

This application is a continuation of application Ser. No. 08/836,404 filed May 2, 1997 now U.S. Pat. No. 6,128,333, which is a 371 application of PCT/JP96/02493, filed Sep. 4, 1996.

FIELD OF THE INVENTION

The present invention relates to a spread spectrum (SS) radio transmission digital mobile communication device such as a spread spectrum radio transmitter and receiver used in digital cellular communication.

BACKGROUND ART

In the land mobile communication, there are a plurality of propagation paths from a transmitting point to a receiving point, and a received wave is a synthesized wave composed of a plurality of waves with different propagation paths. For this reason, radio waves transmitted from a transmitting point at the same time are turned to a plurality of signal waves, which are propagated through a plurality of paths. As a result, these waves reach at a receiving point with some deviation over time, and they reach the receiving point while interfering with each other. To eliminate this, path separation is performed by utilizing property of data diffusion in the spread spectrum radio transmission, and the separated signals are synthesized and path synthesizing gain is obtained to improve the receiving characteristics.

In a conventional type spread spectrum radio transmitter and receiver having RAKE receiving functions to eliminate the influence of multi-path as described above comprises, as shown in FIG. 22, a receiving antenna unit 2201, a high frequency unit 2202 for converting a signal received by antenna to a signal of intermediate frequency band, an orthogonal detection unit 2203 for picking up baseband signal from signals of intermediate frequency band, and a RAKE receiver 2210 for carrying out signal processing to eliminate influence of multi-path. The RAKE receiver 2210 comprises an inverse diffuser for performing inverse diffusion to the received signals, delay adjusters 2212-1 to 212-K for adjusting time delay of the signal obtained by path separation, amplification factor variable amplifiers 2213-1 to 2213-K, a propagation path coefficient controller 2214 for controlling amplification factor of each of the amplification factor variable amplifiers 2213-1 to 2213-K, and a RAKE receiving unit adder 2215 for synthesizing signals of each path. In the present application, the terms "antenna" and "adaptive antenna" are applied to those of general concept, while the terms "antenna unit" and "adaptive antenna unit" indicate concrete components respectively.

In a conventional type receiving device, radio wave is received first by the receiving antenna unit 2201, and the received signal is converted to a signal of intermediate frequency band by the high frequency unit 2202. The orthogonal detection unit 2203 picks up a baseband signal by orthogonal detection of the signal of intermediate frequency band. The baseband signal is inversely diffused by an inverse diffuser 2211. On the inverse diffuser 2211, inverse diffusion processing practiced in CDMA (Code Division Multiple Access) is performed, i.e. correlative processing is performed for the received signal and diffusion signal, and only highly correlative components of the received signal are left, and delayed wave having delay time greater than chip time width of diffusion signal is detected. Then, at the delay adjuster 2212-m, delay time is compensated and unnecessary signals are removed according to delay time. Phase adjustment by such signal processing and processing of the phase not adjusted here in the subsequent stage by an amplifier are generally practiced in RAKE receiving. The amplitude of output of the phase adjustment delay adjuster 2212-m is adjusted at the amplification factor variable amplifier 2213-m for each of path "m", and path synthesizing is performed at the RAKE receiving device adder. Here, m represents an integer of 1 to K and is also used to indicate one of paths from the first path to the K-th path. At the propagation path coefficient controller, amplification factor of the amplification factor variable amplifier 2213-m is controlled according to the output of the inverse diffuser 2211.

However, in the RAKE receiving unit of the conventional type spread spectrum radio transmission receiving device, signal processing to match multi-path is performed based on the signal after inverse diffusion. Accordingly, processing can be performed on delay wave greater than chip time width of diffusion signal, and it cannot be performed on the delay wave having delay time smaller than chip time width.

Also, in the conventional type spread spectrum radio transmitter and receiver, the smaller the co-channel interference wave (including interference with other station) is, the higher the receiving characteristics are. Therefore, it is necessary to eliminate co-channel interference wave as far as possible.

DISCLOSURE OF THE INVENTION

To solve the above problems, it is an object of the present invention to provide a spread spectrum radio transmission digital mobile communication device having functions of a RAKE receiving unit, by which it is possible to improve receiving characteristics by reducing influence of delay wave having delay time smaller than chip time width of diffusion signal and the influence of co-channel interference wave.

To attain the above object, the spread spectrum radio transmission mobile communication device comprises inverse diffusion means for obtaining correlation of a received signal with a diffusion signal to execute inverse diffusion, and a synthesizing means for synthesizing paths by giving delay time to match the path to the inverse diffusion signal, whereby there are provided a plurality of receiving branches, variable gain amplifying means for adjusting amplification factor of the signal received at each of the receiving branches, adding means for adding the signals outputted from each of the variable gain amplifying means and for inputting them to the inverse diffusion means, and gain control means for controlling amplification of the variable gain amplifying means to reduce influence of delay wave having delay time smaller than chip time width of diffusion signal in the signal inputted to the inverse diffusion means.

According to the present invention, the signal inversely diffused by the inverse diffusion means is processed by path separation, and the synthesizing means synthesizes paths by giving the delay time to match the path to each signal processed by path separation.

Also, in the present invention, the gain control means controls amplification factor of the variable gain amplifying means so that the influence of the delay wave having delay time smaller than chip time width of diffusion signal in the output signal is decreased according to the output signal of the adding means.

Also, in the present invention, there is provided error rate detecting means for detecting error rate of the output of the synthesizing means and the gain control means for controlling amplification factor of the variable gain amplifying means to reduce the error rate.

Also, in the present invention, the gain control means controls amplification factor of the variable gain amplifying means to reduce the error rate and to decrease influence of the delay wave having delay time smaller than chip time width of diffusion signal in the output signal of the adding means.

Also, in the present invention, there is provided S/N detecting means for detecting signal power to noise power ratio of the output of the synthesizing means, and the gain control means controls amplification factor of the variable gain amplifying means to increase the signal power to noise power ratio.

Further, in the present invention, the gain control means controls amplification factor of the variable gain amplifying means to increase the signal power to noise power ratio and to decrease influence of delay wave having delay time smaller than chip time width of diffusion signal in the output signal of the adding means.

Further, in the present invention, there is provided S/(N+I) detecting means for detecting a signal power to (noise power+interference power) ratio of output of the synthesizing means, and gain control means controls amplification factor of the variable gain amplifying means to increase the signal power to (noise power+interference power) ratio.

Also, in the present invention, the gain control means controls amplification factor of the variable gain amplifying means to increase the signal power to (noise power+interference power) ratio and to decrease influence of the delay wave having delay time smaller than chip time width of the diffusion signal in the output signal of the adding means.

Further, in the present invention, there are provided a plurality of combinations of the variable gain amplifying means, the adding means for adding output signals of the variable gain amplifying means, and the inverse diffusion means where signals are inputted from the adding means, and the synthesizing means synthesizes paths by giving delay time to match path to each signal outputted from the inverse diffusion means.

Also, in the present invention, the gain control means controls amplification factor of the variable gain amplifying means to decrease influence of delay wave having delay time smaller than chip time width of the diffusion signal in the output signal based on the output signal of the adding means.

Also, in the present invention, there is provided error rate detecting means for detecting error rate of output of the inverse diffusion means, and the gain control means controls amplification factor of the variable gain amplifying means to reduce the error rate.

Further, in the present invention, the gain control means controls amplification factor of the variable gain amplifying means to reduce the error rate and to decrease influence of the delay wave having delay time smaller than chip time width of the diffusion signal of the output signal of the adding means.

Also, in the present invention, there is provided S/N detecting means for detecting the signal power to noise power ratio of output of the inverse diffusion means, and the gain control means controls amplification factor of the variable gain amplifying means to increase the signal power to noise power ratio.

Further, in the present invention, the gain control means controls amplification factor of the variable gain amplifying means to increase the signal power to noise power ratio and to decrease influence of the delay wave having delay time smaller than chip time width of the diffusion signal in the output signal of the adding means.

Further, in the present invention, there is provided S/(N+I) detecting means for detecting the signal power to (noise power+interference power) ratio, and the gain control means controls amplification factor of the variable gain amplifying means to increase the signal power to (noise power+interference power) ratio.

Further, in the present invention, the gain control means controls amplification factor of the variable gain amplifying means to increase the signal power to (noise power+interference power) ratio and to decrease influence of the delay wave having delay time smaller than chip time width of the diffusion signal in the output signal of the adding means.

Also, in the present invention, there are provided a plurality of the gain control means to match the combination of the variable gain amplifying means, the adding means and the inverse diffusion means, and each of the gain control means independently controls amplification factor of the variable gain amplifying means.

Also, in the present invention, the gain control means is provided one each to a plurality of combinations of the variable gain amplifying means, the adding means and the inverse diffusion means, and the gain control means controls amplification factor of the variable gain amplifying means in each of the combinations so that antenna directivity is dispersed.

As described above, by adding the arrangement of adaptive antenna for controlling directivity of the receiving antenna to a spread spectrum radio transmission digital mobile communication device having functions of a RAKE receiving device, it is possible to decrease influence of co-channel interference wave not properly handled by RAKE receiving functions or influence of the delay wave having delay time smaller than chip time width of the diffusion signal.

In the adaptive antenna, signals of a plurality of receiving branches are amplified by amplification factors under control and are added, and the directivity of the receiving antenna is electrically adjusted. The amplification factor is controlled in such manner that the influence of the delay wave having smaller delay width in the output signal of the adding means is minimized or that error rate of the signals processed by path synthesizing is minimized, or that the signal power to noise power ratio or the signal power to (noise power+interference power) ratio is maximized. Or, based on the influence of the delay wave in the output signal of the adding means and the combination of the error rate and the signal power to noise power ratio or the signal power to (noise power+interference power) ratio, it is adjusted in such manner that these reference values are brought closer to the optimal value. As a result, the influence of the delay wave having delay time smaller than chip time width of the diffusion signal and the influence of the co-channel interference wave are removed from the received signal. The signal is inputted to the inverse diffusion means, and after inversely diffused, the influence of delay wave smaller than the chip time width of the diffusion signal is eliminated by RAKE receiving functions.

In the communication device of the present invention having a plurality of inverse diffusion means and provided with adaptive antenna to control directivity of the signal inputted to each of the inverse diffusion means, it is possible to obtain signal of each path by directivity to a plurality of paths and to increase receiving characteristics by path synthesis of these signals.

BRIEF DESCRIPTION OF THE DRAWINGS

The detailed features of the present invention will become more apparent by the following description given in connection with the attached drawings.

FIG. 12 is a block diagram of a spread spectrum radio transmission digital mobile communication device of a twelfth embodiment of the present invention;

BEST MODE FOR CARRYING OUT THE INVENTION

In the following, description will be given on the best mode for carrying out the present invention referring to the preferred embodiments of the spread spectrum radio transmission digital mobile communication device.

(1st Embodiment)

Figure 1:
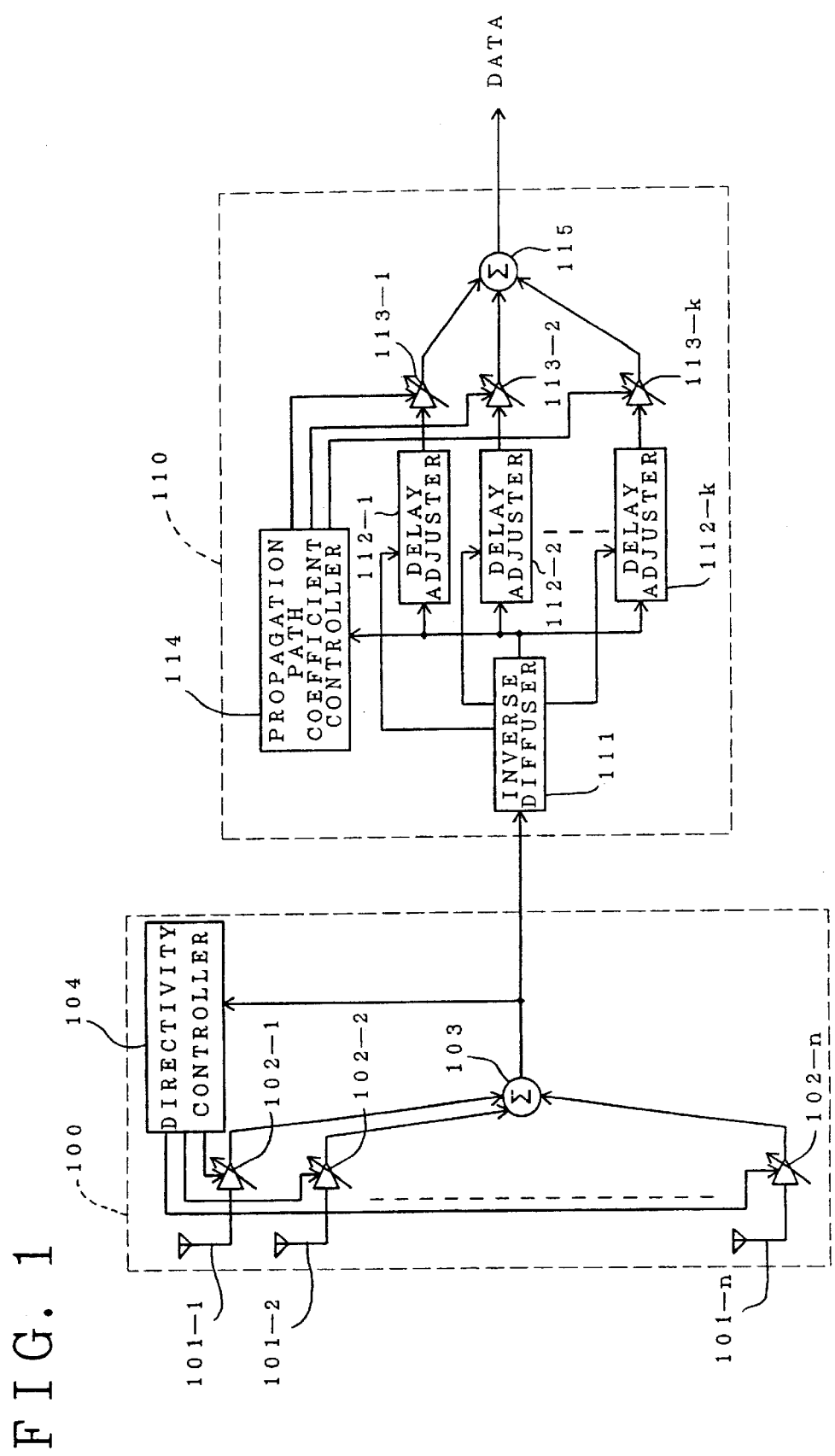
FIG. 1 is a block diagram of a spread spectrum radio transmission digital mobile communication device of a first embodiment of the present invention.

The spread spectrum radio transmission digital mobile communication device of the first embodiment of the invention comprises, as shown in FIG. 1, an adaptive antenna unit 100 for controlling directivity of a receiving antenna and a RAKE receiving unit 110, whereby the adaptive antenna unit 100 comprises "n" (number) receiving antenna units 101-1 to 101-n serving as a plurality of receiving branches, amplification factor variable amplifiers 102-1 to 102-n for adjusting signal level, an adaptive antenna adder 103 for adding signals received at each antenna, and a directivity controller 104 for controlling amplification factor of each of the amplification factor variable amplifiers 102-1 to 102-n, and the RAKE receiving unit 110 comprises, as in the conventional type device, an inverse diffuser, delay adjusters 112-1 to 112-k, amplification factor variable amplifiers 113-1 to 113-k, a propagation path coefficient controller 114 and a RAKE receiving unit adder 115.

The adaptive antenna unit 100 includes a receiving filter, a receiving amplifier, a frequency converter, an intermediate frequency unit, an orthogonal detection unit, etc. as found in an ordinary type radio transmitter and receiver, but these are not shown in the figure to facilitate the explanation on basic principle of the adaptive antenna.

The receiving device is operated as follows: First, "n" (number) receiving antenna units 101-1 to 101-n located at different spatial positions receive radio wave and send it to the amplification factor variable amplifiers 102-1 to 102-n, and each of the amplification factor variable amplifiers 102-i adjusts amplitude and phase of the received signal for each receiving antenna (branch i) under the control of the directivity controller 104. The directivity controller 104 may be composed of a digital signal processor (DSP), a central processing unit (CPU), etc. For example, it is operated as follows: the gain of each of the amplification factor variable amplifiers 102-1 to 102-n is increased or decreased at the same time or separately for each individual amplification variable amplifiers 102-1 to 102-n, and amplitude of each of the corresponding I signals (common in-phase component) and Q signals (quadrature component) is adjusted simultaneously and independently. By controlling the amplitude and the phase of signals of each path "m", the most desirable receiving conditions, i.e. combination of gain and phase to minimize the influence of delay wave having delay time smaller than chip time width of the diffusion signal, is found, and this condition can be set in the amplification factor variable amplifiers 102-1 to 102-n. Such operation can be carried out by executing a program stored in advance in a memory to cooperate with DSP or CPU.

The adaptive antenna adder 103 adds the adjusted signals and provides directivity as the adaptive antenna as a whole. The directivity controller 114 adjusts the amplification factor variable amplifiers 102-i in such manner that the influence of the delay wave having delay time smaller than chip time width of the diffusion signal is minimized, and directivity of adaptive antenna is controlled.

When the influence of the delay wave having delay time smaller than chip time width of the diffusion signal is decreased by the adaptive antenna unit 100, the received signal is inputted to the RAKE receiving unit 110. In the RAKE receiving unit 110, the inverse diffuser 111 takes correlation of the received signal and the diffusion signal as in the conventional type device and detects the delay time greater than chip time width of the diffusion signal. The delay adjuster 112-m performs compensation for delay time and removes signal of unnecessary time. The amplification factor variable amplifier 113-m adjusts amplitude of signal of each path outputted from each of the delay adjusters 112-m, and the RAKE receiving unit adder 115 synthesizes these paths. The propagation path coefficient controller 114 controls amplification factor of the amplification factor variable amplifier 113-m of each path based on the output of the inverse diffuser 111.

As described above, the adaptive antenna unit 100 is provided in the present invention and it is possible according to the spread spectrum transmission digital mobile communication device of the first embodiment of the invention to reduce influence of delay wave having delay time smaller than chip time width of the diffusion signal, which could not be eliminated by the RAKE receiving unit.

(2nd Embodiment)

Figure 2:
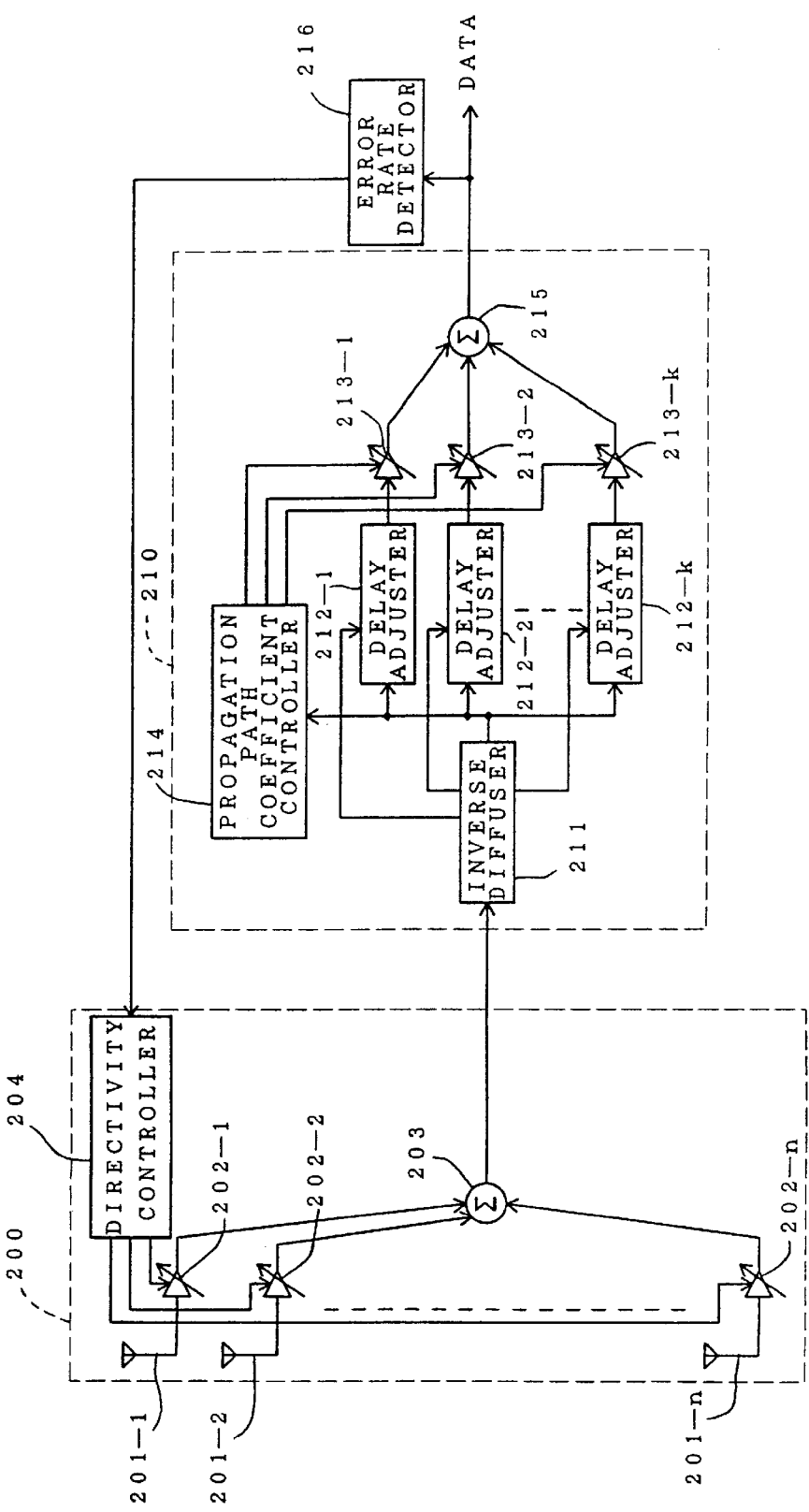
FIG. 2 is a block diagram of a spread spectrum radio transmission digital mobile communication device of a second embodiment of the present invention.

The spread spectrum radio transmission digital mobile communication device of the second embodiment of the invention has, as shown in FIG. 2, the same arrangement as the device of the first embodiment except that there is provided an error rate detector 216 for obtaining error rate of output of the RAKE receiving unit 210, and the directivity controller 204 of the adaptive antenna unit 200 controls amplification factor of the amplification factor variable amplifiers 202-1 to 202-n based on the error rate detected by the error rate detector 216.

In this device, the directivity controller 204 adjusts amplification factor of the amplification factor variable amplifier 202-i to minimize error rate of output signal of the RAKE receiving unit 210 based on output of the error rate detector 316 and controls directivity of the adaptive antenna. As a result, from the adaptive antenna unit 200, received signals are outputted, in which influence of delay wave having delay time smaller than chip time width of the diffusion signal and the influence of co-channel interference are eliminated. To this signal, the RAKE receiving unit 210 performs the same signal processing as in the first embodiment.

As described above, the spread spectrum radio transmission digital mobile communication device of the second embodiment of the invention makes it possible to reduce the influence of delay wave having delay time smaller than chip time width of the diffusion signal and also to reduce the influence of co-channel interference wave, as not removable by the RAKE receiving unit, based on error rate of output signal of the RAKE receiving unit 210.

(3rd Embodiment)

Figure 3:
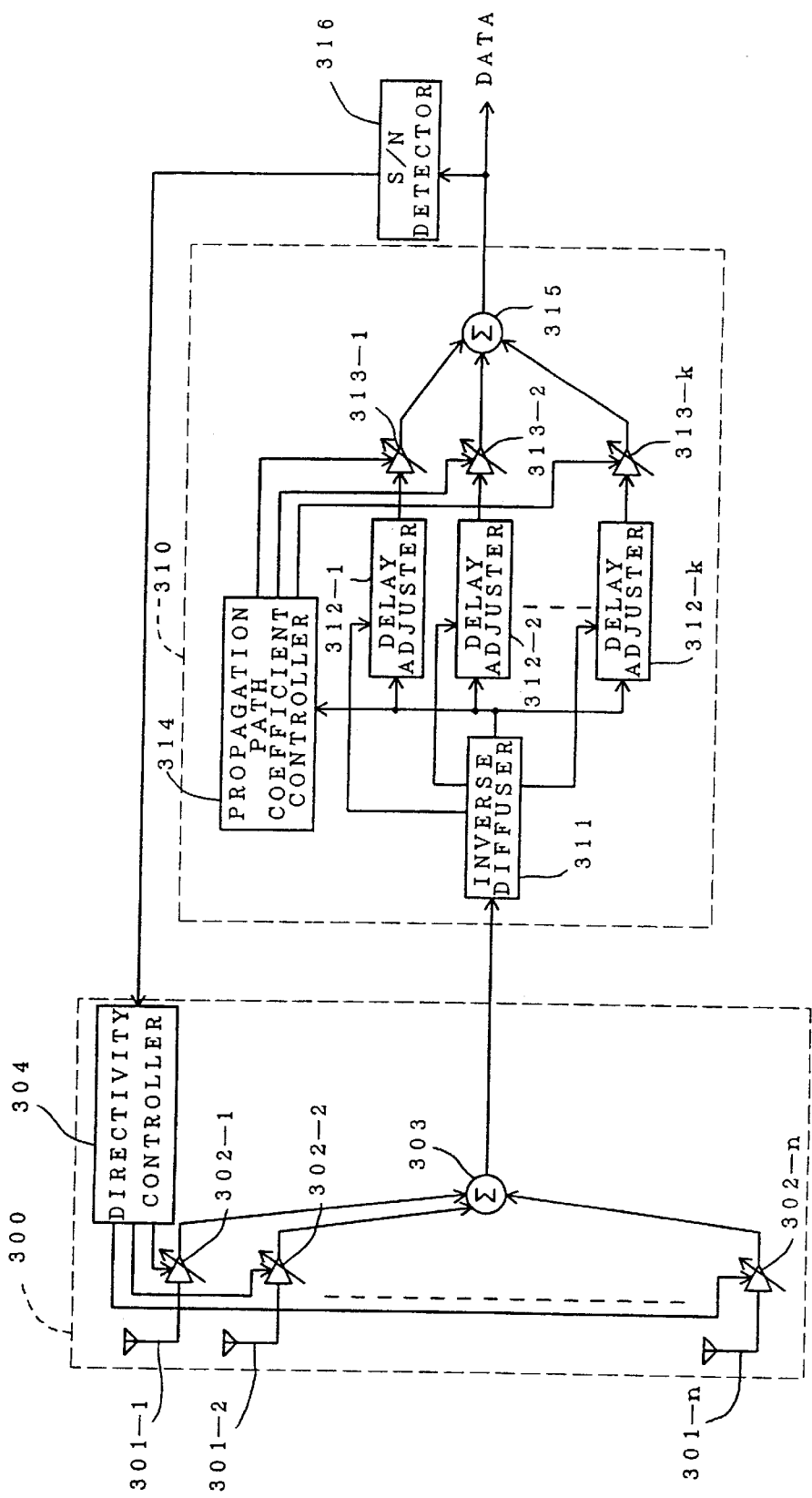
FIG. 3 is a block diagram of a spread spectrum radio transmission digital mobile communication device of a third embodiment of the present invention.

The spread spectrum radio transmission digital mobile communication device of the third embodiment of the present invention comprises, as shown in FIG. 3, an S/N detector 316 for obtaining a signal power to noise power ratio of output of the RAKE receiving unit 310, and the directivity controller 304 of the adaptive antenna unit 300 controls amplification factor of the amplification factor variable amplifiers 302-1 to 302-n based on output signal of the S/N detector 316. The other arrangement is the same as in the first embodiment.

In this device, the directivity controller 304 adjusts the amplification variable amplifiers 302-i so that the signal power to noise power ratio in the output of the RAKE receiving unit 310 is maximized and it controls directivity of the adaptive antenna. As a result, from the adaptive antenna unit 300, the received signal is outputted, in which influence of the delay wave having delay time smaller than chip time width of diffusion signal and influence of co-channel interference are reduced. To this signal, the RAKE receiving unit 310 performs signal processing in the same manner as in the first embodiment.

As described above, the spread spectrum radio transmission digital mobile communication device of the third embodiment of the present invention makes it possible to reduce influence of delay wave having delay time smaller than chip time width of diffusion signal and influence of co-channel interference wave based on S/N ratio of output signal of the RAKE receiving unit 310.

(4th Embodiment)

Figure 4:
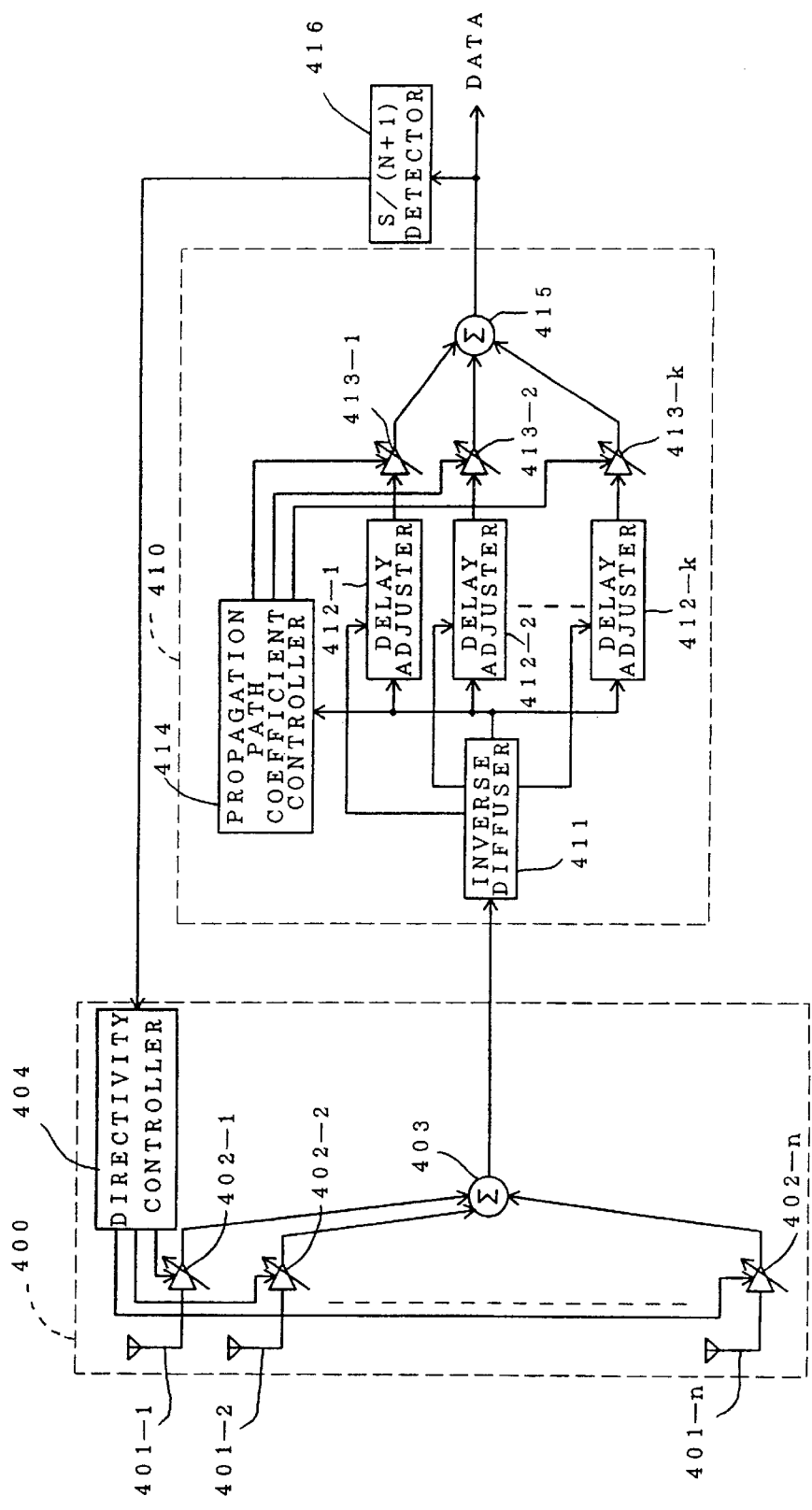
FIG. 4 is a block diagram of a spread spectrum radio transmission digital mobile communication device of a fourth embodiment of the present invention.

The spread spectrum radio transmission digital mobile communication device of the fourth embodiment of the invention comprises, as shown in FIG. 4, an S/(N+I) detector 416 for obtaining a signal power to (noise power+co-channel interference power) ratio of output of the RAKE receiving unit 410, and the directivity controller 404 of the adaptive antenna unit 400 controls amplification factor of the amplification factor variable amplifiers 402-1 to 402-n based on output signal of the Sr(N+I) detector 416. The other arrangement is the same as in the device of the first embodiment.

In this device, the directivity controller 404 adjusts the amplification factor variable amplifiers 402-i so that the signal power to (noise power+co-channel interference power) ratio in the output of the RAKE receiving unit 410 is minimized based on the detection output of the Sa(N+I) detector 416 and directivity of the adaptive antenna is controlled. As a result, from the adaptive antenna unit 400, the received signal is outputted, in which influence of delay wave having delay time smaller than chip time width of diffusion signal and the influence of co-channel interference are decreased. To this signal, the RAKE receiving unit 410 perform s the same signal processing as in the first embodiment.

As described above, the spread spectrum radio transmission digital mobile communication device makes it possible to reduce influence of delay wave having delay time smaller than chip time width of diffusion signal and also influence of co-channel interference wave, as not removable by the RAKE receiving unit, based on the signal power to (noise power+co-channel interference power) ratio of output signal of the RAKE receiving unit 410.

(5th Embodiment)

Figure 5:
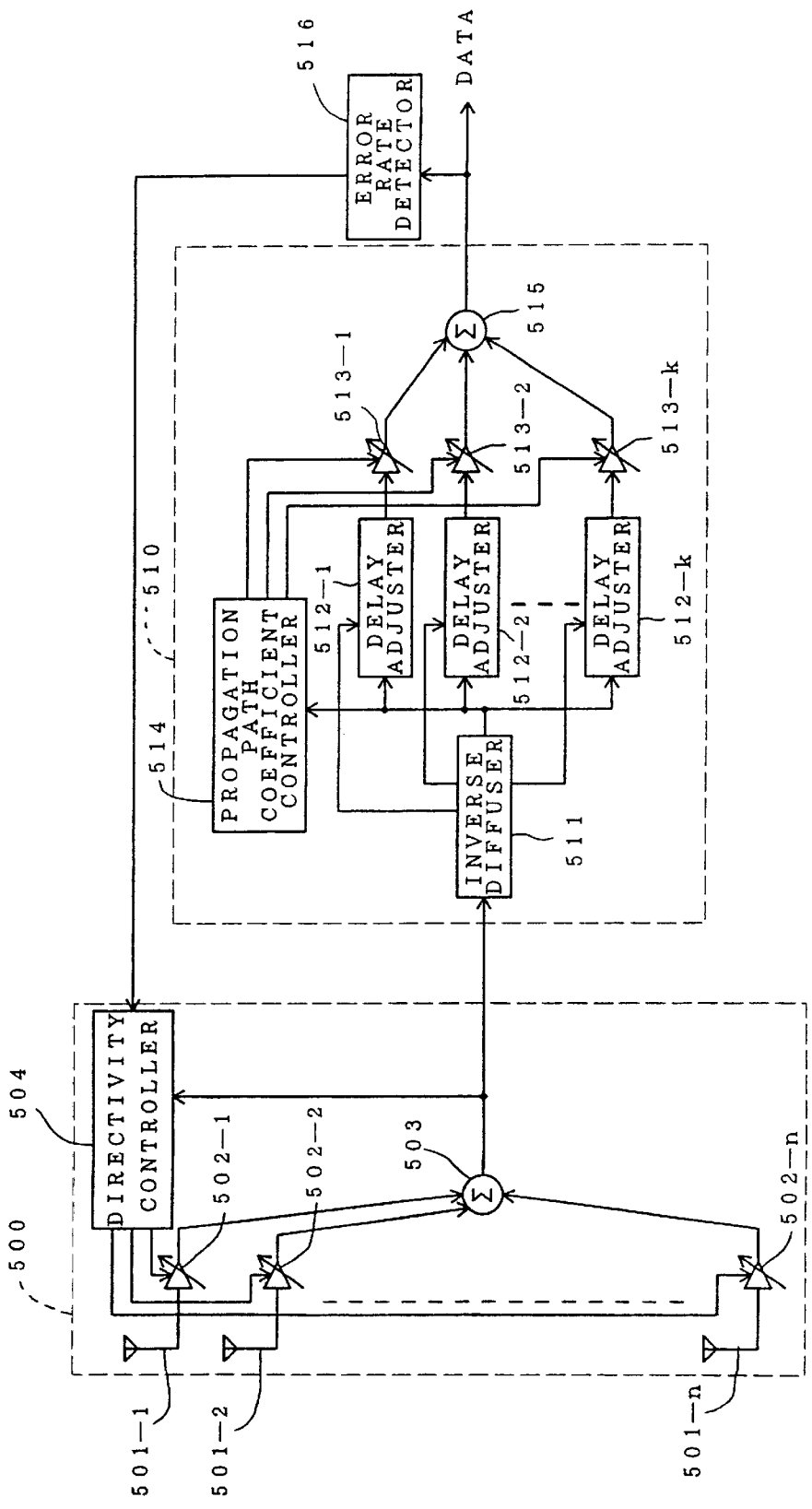
FIG. 5 is a block diagram of a spread spectrum radio transmission digital mobile communication device of a fifth embodiment of the present invention.

In the spread spectrum radio transmission digital mobile communication device of the fifth embodiment of the invention, as shown in FIG. 5, the directivity controller 504 of the adaptive antenna unit 500 controls amplification factor of the amplification factor variable amplifiers 502-1 to 502-n based on the output of the adaptive antenna adder 503 and on detection output of the error rate detector 506. In this fifth embodiment, the directivity controller 504 performs control operation based on two signals, and amplification factors of the amplification factor variable amplifiers 502-1 to 502-n are controlled simultaneously or sequentially so that these two signals are optimized. The other arrangement is the same as in the device of the second embodiment.

In this device, the directivity controller 504 controls amplification factor of the amplification factor variable amplifiers 502-i so that the influence of delay wave having delay time smaller than chip time width of diffusion signal in the output signal of the adaptive antenna adder 503 is reduced and error rate of output signal of the RAKE receiving unit 510 is decreased, and directivity of the adaptive antenna is controlled. From the adaptive antenna unit 500, received signal is outputted, in which influence of delay wave having delay time smaller than chip time width of diffusion signal and the influence of co-channel interference are decreased. To this signal, the RAKE receiving unit 510 performs the signal processing in the same manner as in the second embodiment.

As described above, the spread spectrum radio transmission digital mobile communication device decreases influence of delay wave having delay time smaller than chip time width of diffusion signal and influence of co-channel interference wave based on output of the adaptive antenna adder 503 and error rate of output signal of the RAKE receiving unit 510.

(6th Embodiment)

Figure 6:
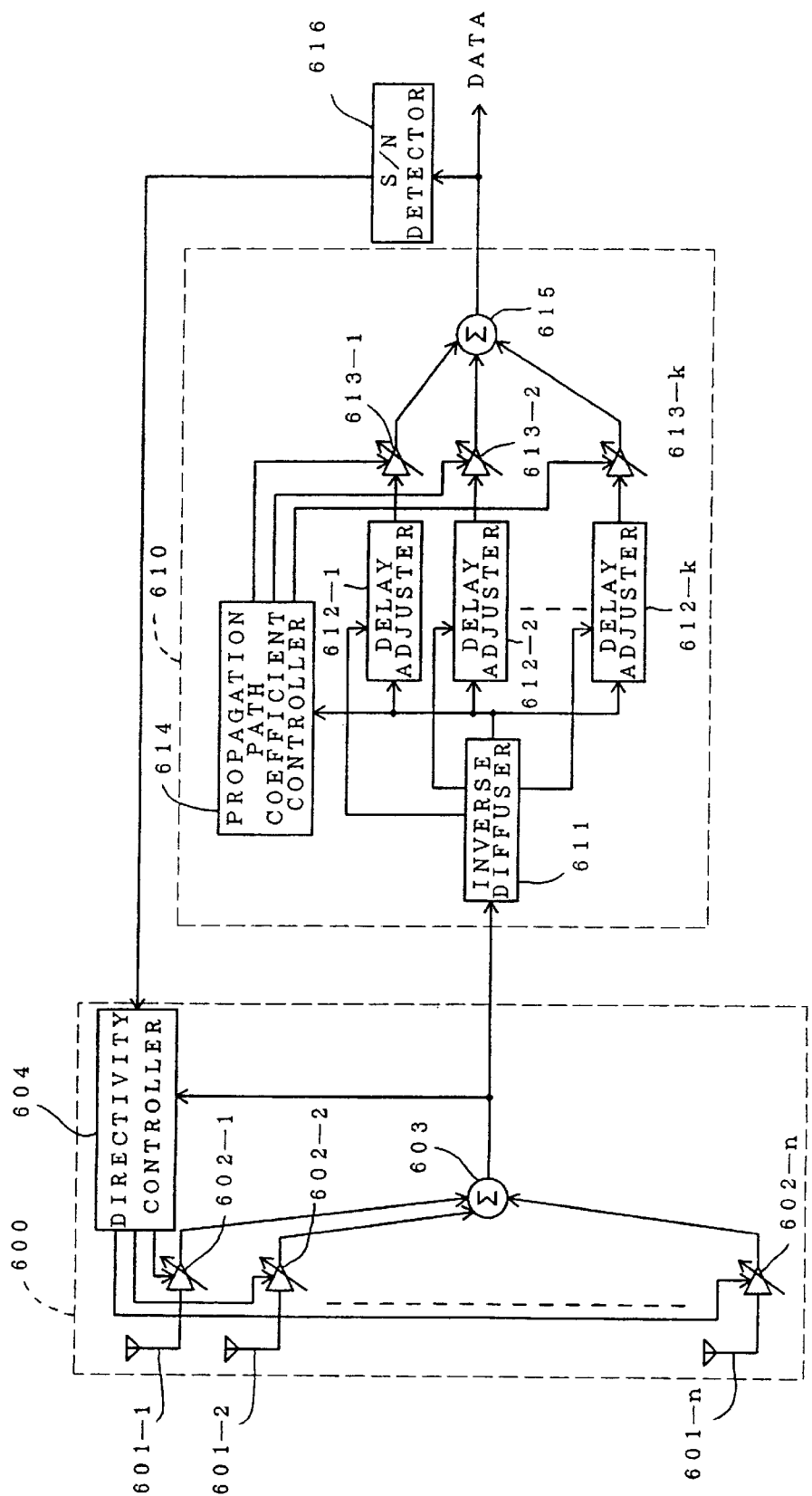
FIG. 6 is a block diagram of a spread spectrum radio transmission digital mobile communication device of a sixth embodiment of the present invention.

In the spread spectrum radio transmission digital mobile communication device of the sixth embodiment of the invention, as shown in FIG. 6, the directivity controller 604 of the adaptive antenna unit 600 controls amplification factor of the amplification factor variable amplifiers 602-1 to 602-n based on output of the adaptive antenna adder 603 and on detection output of the S/N detector 616. The method to control the amplification factor based on two signals is the same as that of the fifth embodiment, and this also applies to the embodiments described below. The other arrangement is the same as in the device of the third embodiment.

In this device, the directivity controller 604 adjusts the amplification factor variable amplifiers 602-i so that influence of delay wave having delay time smaller than chip time width of diffusion signal in output signal of the adaptive antenna adder 603 is decreased and that S/N ratio of output signal of the RAKE receiver 610 is increased, and directivity of the adaptive antenna is. controlled. As a result, from the adaptive antenna unit 600, receiving signal is outputted, in which influence of delay wave having delay time smaller than chip time width of diffusion signal and influence of co-channel interference are decreased. To this signal, the RAKE receiver 610 performs the same signal processing as in the third embodiment.

As described above, the spread spectrum radio transmission digital mobile communication device decreases influence of delay wave having delay time smaller than chip time width of diffusion signal and also influence of co-channel interference wave, not removable by the RAKE receiver, based on output of the adaptive antenna adder 603 and on S/N ratio of output signal of the RAKE receiver 610.

(7th Embodiment)

Figure 7:
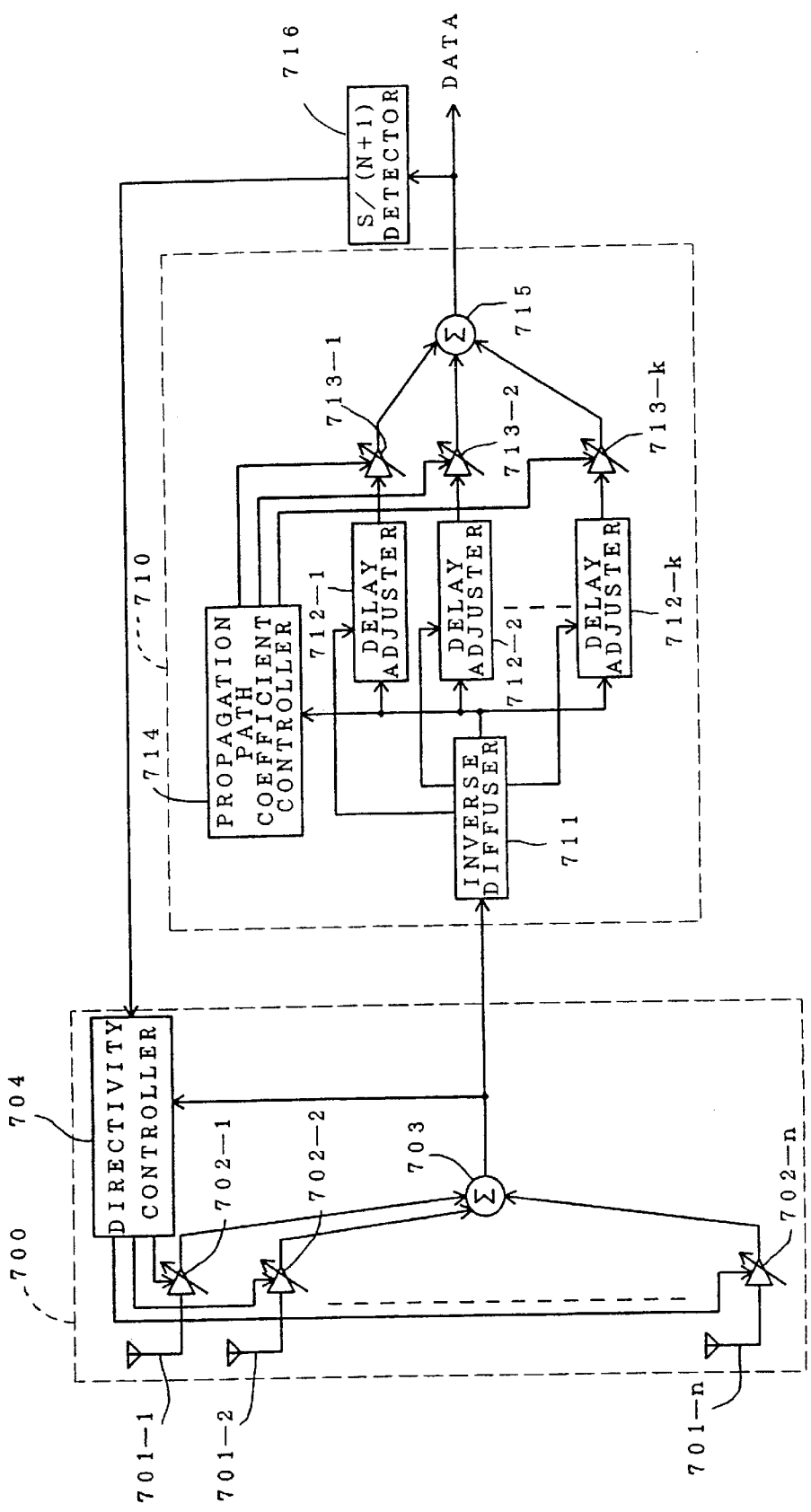
FIG. 7 is a block diagram of a spread spectrum radio transmission digital mobile communication device of a seventh embodiment of the present invention.

In the spread spectrum radio transmission digital mobile communication device of the seventh embodiment, as shown in FIG. 7, the directivity controller 704 of the adaptive antenna unit 700 controls amplification factor of the amplification factor variable amplifiers 702-1 to 702-n based on output of the adaptive antenna adder 703 and on detection output of the S/(N+I) detector 716. The other arrangement is the same as in the device of the fourth embodiment.

In this device, the directivity controller 704 adjusts amplification factor of the amplification factor variable amplifiers 702-i so that influence of delay wave having delay time smaller than chip time width of diffusion signal in output signal of the adaptive antenna adder 703 is decreased and that the signal power to (noise power+co-channel interference power) ratio of output signal of the RAKE receiver 710 is increased, and directivity of the adaptive antenna is controlled. As a result, from the adaptive antenna unit 700, receiving signal is outputted, in which influence of delay wave having delay time smaller than chip time width of diffusion signal and influence of co-channel interference wave are decreased. To this signal, the RAKE receiver 710 performs the same signal processing as in the fourth embodiment.

As described above, the spread spectrum radio transmission digital mobile communication device decreases influence of delay wave having delay time smaller than chip time width of diffusion signal and influence of co-channel interference wave based on output of the adaptive antenna adder 703 and on the signal power to (noise power+co-channel interference power) ratio of output signal of the RAKE receiver 710.

(8th Embodiment)

Figure 8:
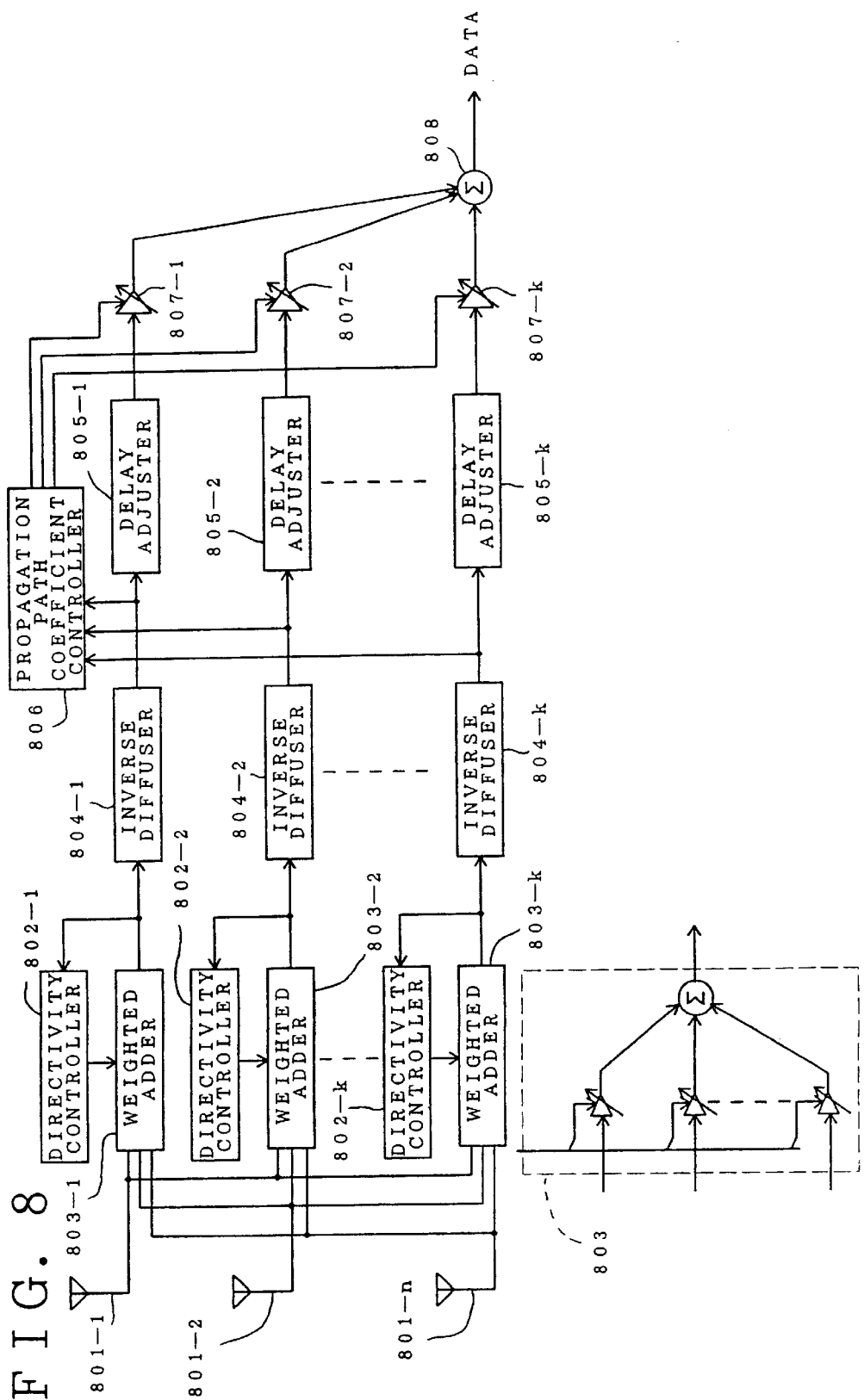
FIG. 8 is a block diagram of a spread spectrum radio transmission digital mobile communication device of an eighth embodiment of the present invention.

The spread spectrum radio transmission digital mobile communication device of the eighth embodiment of the invention comprises, as shown in FIG. 8, "n" (number) receiving antenna units 801-1 to 801-n, directivity controllers 802-1 to 802-k for independently controlling directivity of paths "m", weighted adders 803-1 to 803-k for performing weighting to signal of each of the paths "m", inverse diffusers 804-1 to 804-k for inversely diffusing signal of each of the paths "m", delay adjusters 805-1 to 805-k for adjusting time delay of output signal of each of the inverse diffusers 804-1 to 804-k, amplification factor variable amplifiers 807-1 to 807-k for adjusting amplitude of signal of each of the paths "m", a propagation path coefficient controller 806 for controlling amplification factor of the amplification factor variable amplifiers 807-1 to 807-k, and an adder 808 for synthesizing signals of each path.

Each of the weighted adders 803-1 to 803-k comprises as shown by reference numeral 808 in the figure, variable amplifiers for amplifying signals by amplification factor specified from the directivity controllers 802-1 to 802-k and an adder for adding outputs of each of the variable amplifiers. Receiving filter, receiving amplifier, frequency converter, intermediate frequency unit, orthogonal detection unit, etc. included in an ordinary type radio transmitter and receiver are not shown in the figure.

In the receiving device, "n" (number) receiving antenna units 801-1 to 801-n located at different spatial positions receive radio wave and output it to the weighted adders 803-1 to 803-k, which amplify each of the received signals by amplification factor controlled by the directivity controllers 802-1 to 802-k and add them. The directivity controllers 802-1 to 802-k independently adjust weighting of each of the weighted adders 803-1 to 803-k so that influence of delay wave having delay time smaller than chip time width of diffusion signal and influence of co-channel interference are minimized in output of the corresponding weighted adders 803-1 to 803-k and control directivity corresponding to each of the paths "m". In this way, the weighted adders 803-1 to 803-k and the directivity controllers 802-1 to 802-k provide "k" types of antenna directivity.

After influence of delay wave having delay time smaller than chip time width of diffusion signal and influence of co-channel interference are decreased by the adaptive antenna, the received signal is inversely diffused by the inverse diffusers 804-1 to 804-k corresponding to each of the paths. The inverse diffusers 804-1 to 804-k take correlation of the received signal and diffusion signal and detects delay time greater than chip time width of diffusion signal. Then, delay time is compensated and signals of unnecessary time are removed at the delay adjusters 805-1 to 805-k. The amplitude of the output of each of the delay adjusters 805-1 to 805-k is adjusted by the amplification factor variable amplifiers 807-m for each of the paths "m", and the paths are synthesized at the adder 808. The propagation path coefficient controller 806 controls amplification factor of the amplification factor variable amplifiers 807-1 to 807-k of each path based on output of the inverse diffusers 804-1 to 804-k.

As described above, in the spread spectrum radio transmission digital mobile communication device, antenna directivity to signal of each path "m" is maintained by independent control operation of a plurality of directivity controllers, and signal of each path "m" is provided, in which influence of delay wave of delay time smaller than chip time width of diffusion signal and influence of co-channel interference wave are decreased. The signal of each of the paths "m" is inversely diffused by "k" (number) inverse diffusers, and amount of delay is adjusted so that influence of delay wave having delay time greater than chip time width of diffusion signal is eliminated and signal paths are synthesized. That is, by independent control operation of a plurality of directivity controllers, the signal of the path "m" agreeing with the directivity is picked up, and amount of delay of each signal thus picked up is adjusted and signal paths are synthesized. As a result, influence of delay wave having delay time smaller than chip time width of diffusion signal and influence of co-channel interference, as not removable, by the RAKE receiver, are decreased and overall receiving characteristics are improved.

(9th Embodiment)

Figure 9:
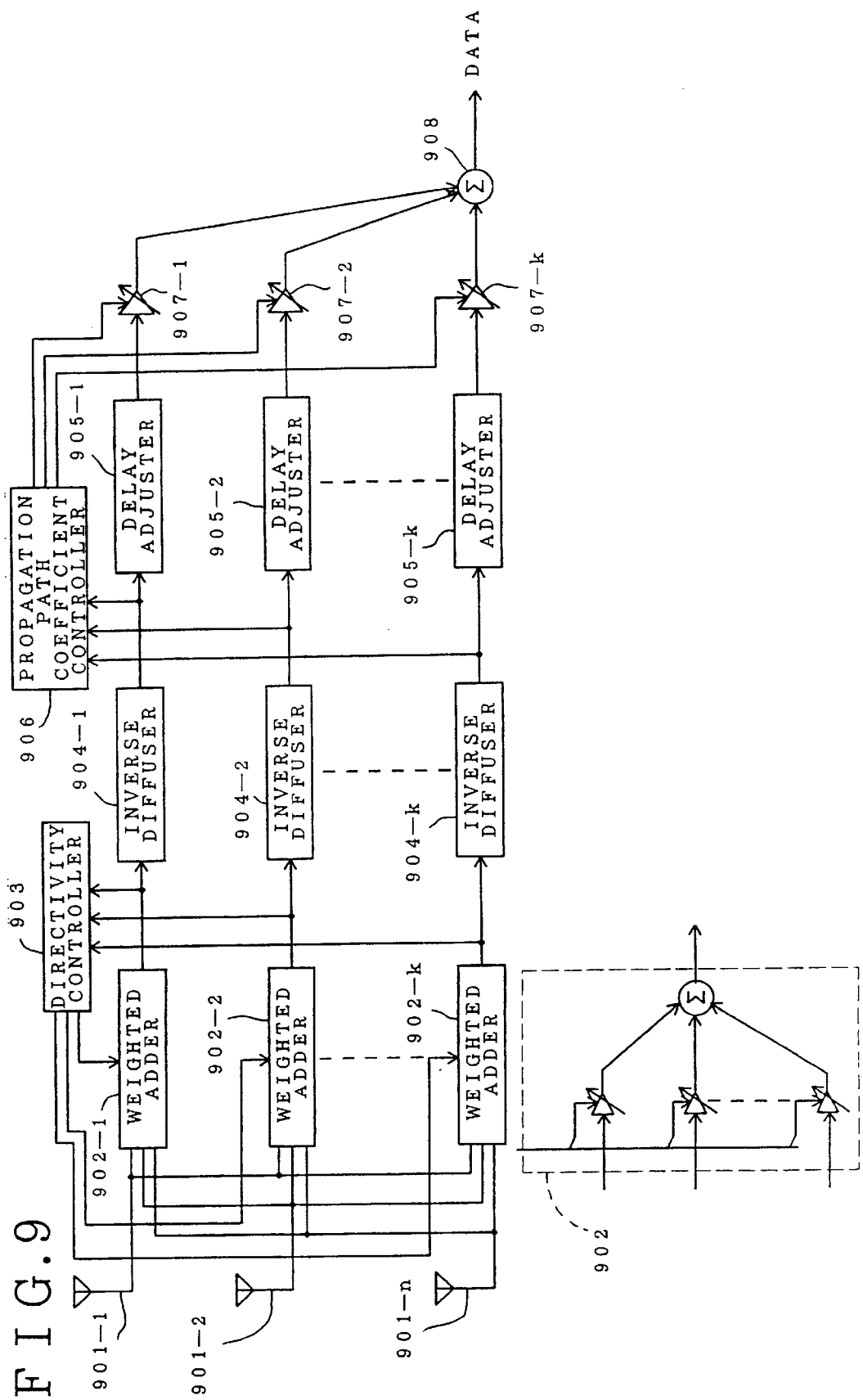
FIG. 9 is a block diagram of a spread spectrum radio transmission digital mobile communication device of a ninth embodiment of the present invention.

The spread spectrum radio transmission digital mobile communication device of the ninth embodiment comprises, as shown in FIG. 9, a directivity controller 903 for controlling directivity of each of weighted adders 902-1 to 902-k instead of individual directivity controllers. The other arrangement is the same as in the device of the eighth embodiment.

In this device, the weighted adders 901-1 to 902-k and the directivity controller 903 adjust weighting of radio wave received at "n" (number) receiving antenna units 901-1 to 901-n and provide "k" (number) types of antenna directivity. In this case, the directivity controller 903 controls in such manner that "k" types of main directivity provided by the weighted adders 902-1 to 902-k do not catch radio waves from the same direction and that path synthesizing gain is maximized. The directivity controller 903 adjusts the weighted adders 902-1 to 902-k of each path so that influence of delayy wave having delay time smaller than chip time width of diffusion signal and influence of co-channel interference are minimized to each output of the weighted adders 902-1 to 902-k. The other operation is the same as in the device of the eighth embodiment.

In this device, it is possible to decrease influence of delay wave having delay time smaller than chip time width of diffusion signal and also influence of co-channel interference wave, not removable by the RAKE receiving unit from the received signal. Because it is controlled in such manner that "k" (number) types of antenna directivity are not overlapped each other, higher path synthesis gain is obtained than in the case where no such control is performed, and this contributes to improvement of overall receiving characteristics.

(10th Embodiment)

Figure 10:
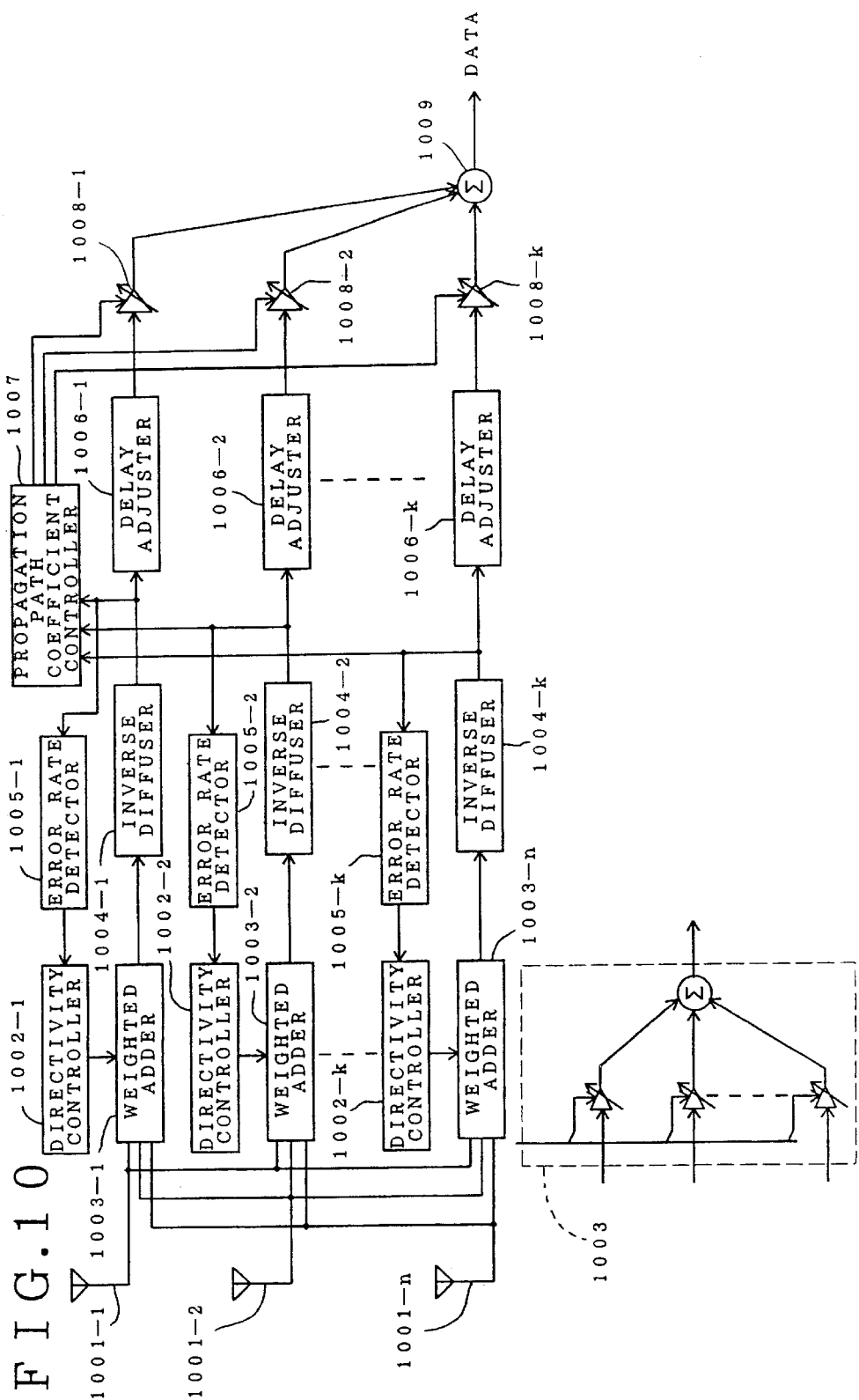
FIG. 10 is a block diagram of a spread spectrum radio transmission digital mobile communication device of a tenth embodiment of the present invention.

The spread spectrum radio transmission digital mobile communication device of the tenth embodiment of the present invention comprises, as shown in FIG. 10, error rate detectors 1005-1 to 1005-k for detecting error rate from output signals of each of inverse diffusers 1004-1 to 1004-k, and each of directivity controllers 1002-1 to 1002-k adjusts weighted adders 1003-1 to 1003-k based on error rate outputted from the error rate detectors 1005-1 to 1005-k. The other arrangement is the same as in the device of the eighth embodiment.

In this device, the error rate detectors 1005-1 to 1005-k obtain error rate from output signals of the inverse diffusers 1004-1 to 1004-k for each of the paths "m", and the directivity controllers 1002-1 to 1002-k adjust weighted adders 1003-1 to 1003-k of each path so that error rate of each path to output of the inverse diffusers 1004-1 to 1004-k is minimized, thus controlling directivity corresponding to each path.

Therefore, in the spread spectrum radio transmission digital mobile communication device of the tenth embodiment, influence of co-channel interference wave and influence of delay wave are eliminated based on the condition that error rate after inverse diffusion is minimized by the adaptive antenna for each path.

(11th Embodiment)

Figure 11:
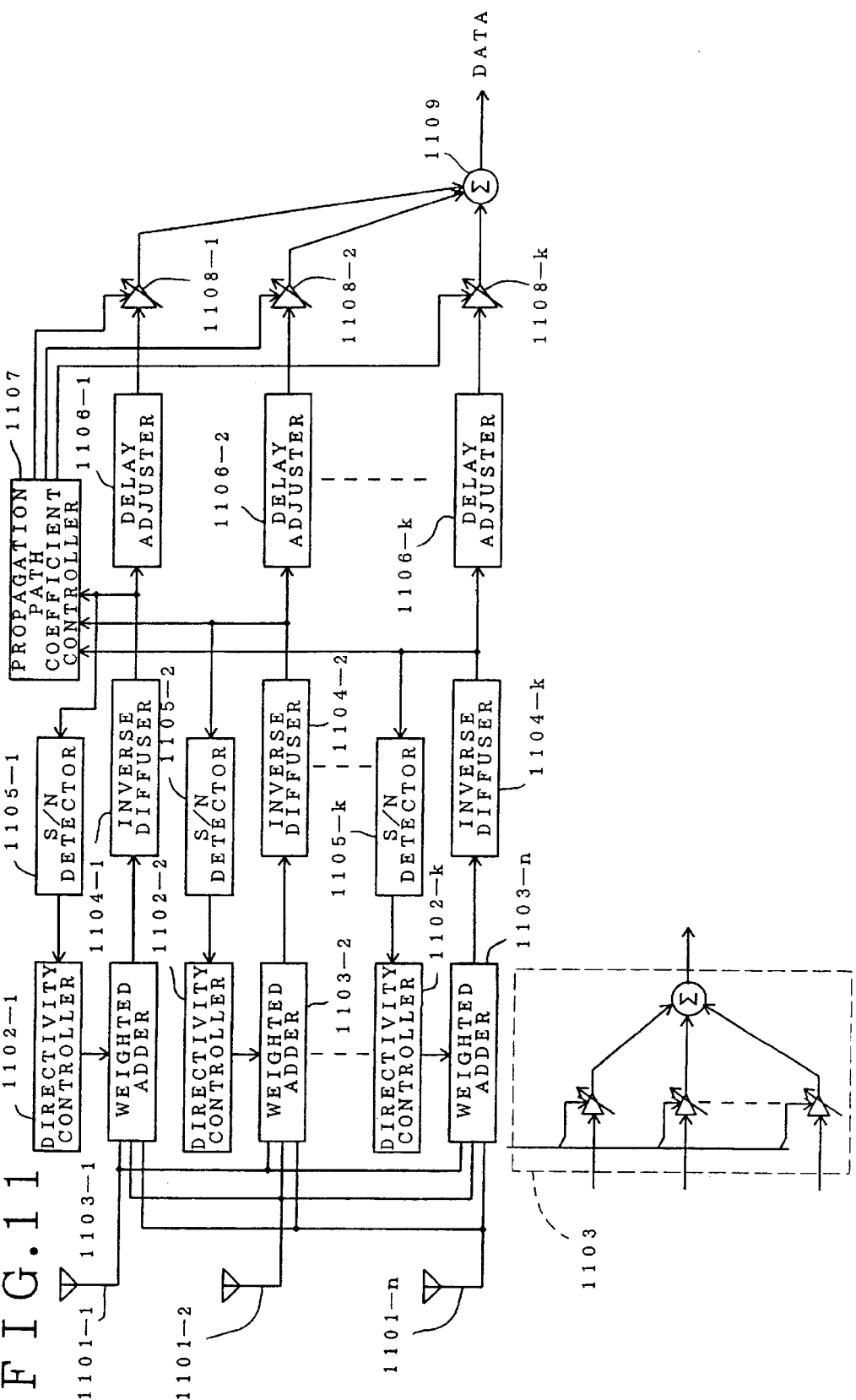
FIG. 11 is a block diagram of a spread spectrum radio transmission digital mobile communication device of an eleventh embodiment of the present invention.

The spread spectrum radio transmission digital mobile communication device of the eleventh embodiment of the invention comprises, as shown in FIG. 11, S/N detectors 1105-1 to 1105-k for detecting a signal power to noise power ratio of output signal of each of inverse diffusers 1104-1 to 1104-k, and each of directivity controllers 1102-1 to 1102-k adjusts weighted adders 1103-1 to 1103-k based on output of the S/N detectors 1105-1 to 1105-k. The other arrangement is the same as in the device of the eighth embodiment.

In this device, the S/N detectors 1105-1 to 1105-k obtain the signal power to noise power ratio from output signal of inverse diffusers 1104-1 to 1104-k for each of paths "m", and the directivity controllers 1102-1 to 1102-k adjust the weighted adders 1103-1 to 1103-k of each path so that the signal power to noise power ratio of output of the inverse diffusers 1104-1 to 1104-k is maximized, and the directivity to each path is controlled. Therefore, in the spread spectrum radio transmission digital mobile communication device of the eleventh embodiment, influence of co-channel interference wave and influence of delay wave are eliminated by the adaptive antenna for each path under the condition that S/N ratio after inverse diffusion is maximized.

(12th Embodiment)

Figure 12:
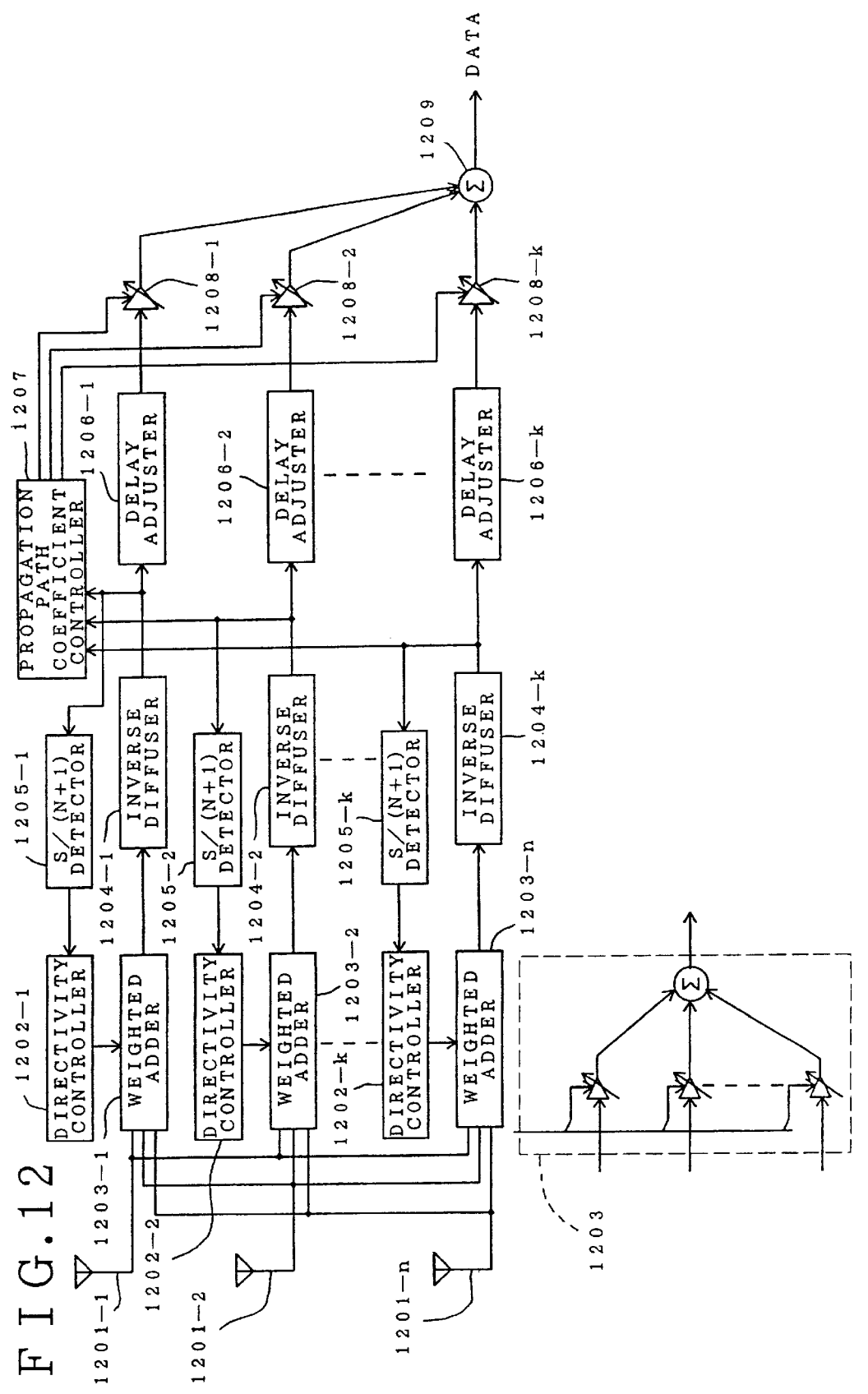

The spread spectrum radio transmission digital mobile communication device of the twelfth embodiment of the present invention comprises, as shown in FIG. 12, S/(N+I) detectors 1205-1 to 1205-k for detecting signal power to (noise power+interference wave power) in output signal of each of inverse diffusers 1204-1 to 1204-k, and each of directivity controllers 1202-1 to 1202-k adjusts weighted adders 1203-1 to 1203-k based on output of the S/(N+I) detectors 1205-1 to 1205-k. The other arrangement is the same as in the device of the eighth embodiment.

In this device, the S/(N+I) detectors 1205-1 to 1205-k obtain the signal power to (noise power+interference wave power) ratio from output signal of inverse diffusers 1204-1 to 1204-k for each of paths "m", and the directivity controllers 1202-1 to 1202-k adjust the weighted adders 1203-1 to 1208-k for each path so that the signal power to (noise power+interference wave power) ratio in output of the inverse diffusers 1204-1 to 1204-k is maximized, and the directivity to each path is controlled. Therefore, in the spread spectrum radio transmission digital mobile communication device of the twelfth embodiment, influence of co-channel interference wave and influence of delay wave are eliminated by the adaptive antenna for each path under the condition that the SI(N+I) ratio of signal after inverse diffusion is maximized.

(13th Embodiment)

Figure 13:
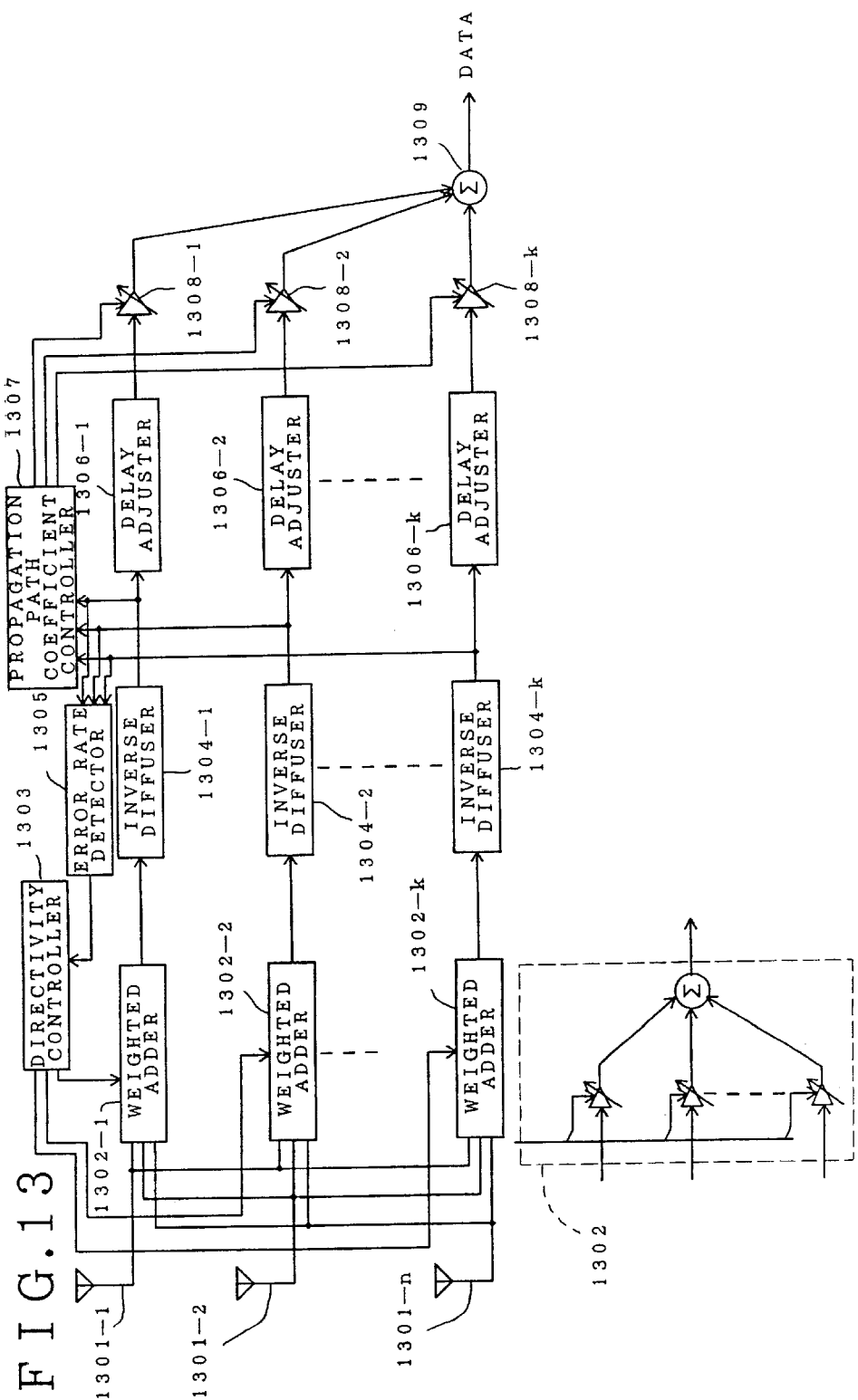
FIG. 13 is a block diagram of a spread spectrum radio transmission digital mobile communication device of a thirteenth embodiment of the present invention.

The spread spectrum radio transmission digital mobile communication device of the thirteenth embodiment of the invention comprises, as shown in FIG. 13, an error rate detector 1305 for detecting error rate from output signal of each of inverse diffusers 1304-1 to 1304-k, and a directivity controller 1303 adjusts weighted adders 1302-1 to 1302-k based on error rate outputted by the error rate detector 1305. The other arrangement is the same as in the device of the ninth embodiment.

In this device, the error rate detector 1305 obtains error rate from output signal of the inverse diffusers 1304-1 to 1304-k for each of paths "m", and the directivity controller 1303 adjusts the weighted adders 1302-1 to 1302-k for each path so that error rate of each path to output of the inverse diffusers 1304-1 to 1304-k is maximized and that main directions of "k" types of antenna directivity are not overlapped each other, and directivity to each path is controlled. Therefore, in the spread spectrum radio transmission digital mobile communication device of the thirteenth embodiment, influence of co-channel interference wave and influence of delay wave are eliminated by the adaptive antenna for each path, as controlled to prevent overlapping of main directions of antenna directivity, under the condition that error rate of signals after inverse diffusion is minimized.

(14th Embodiment)

Figure 14:
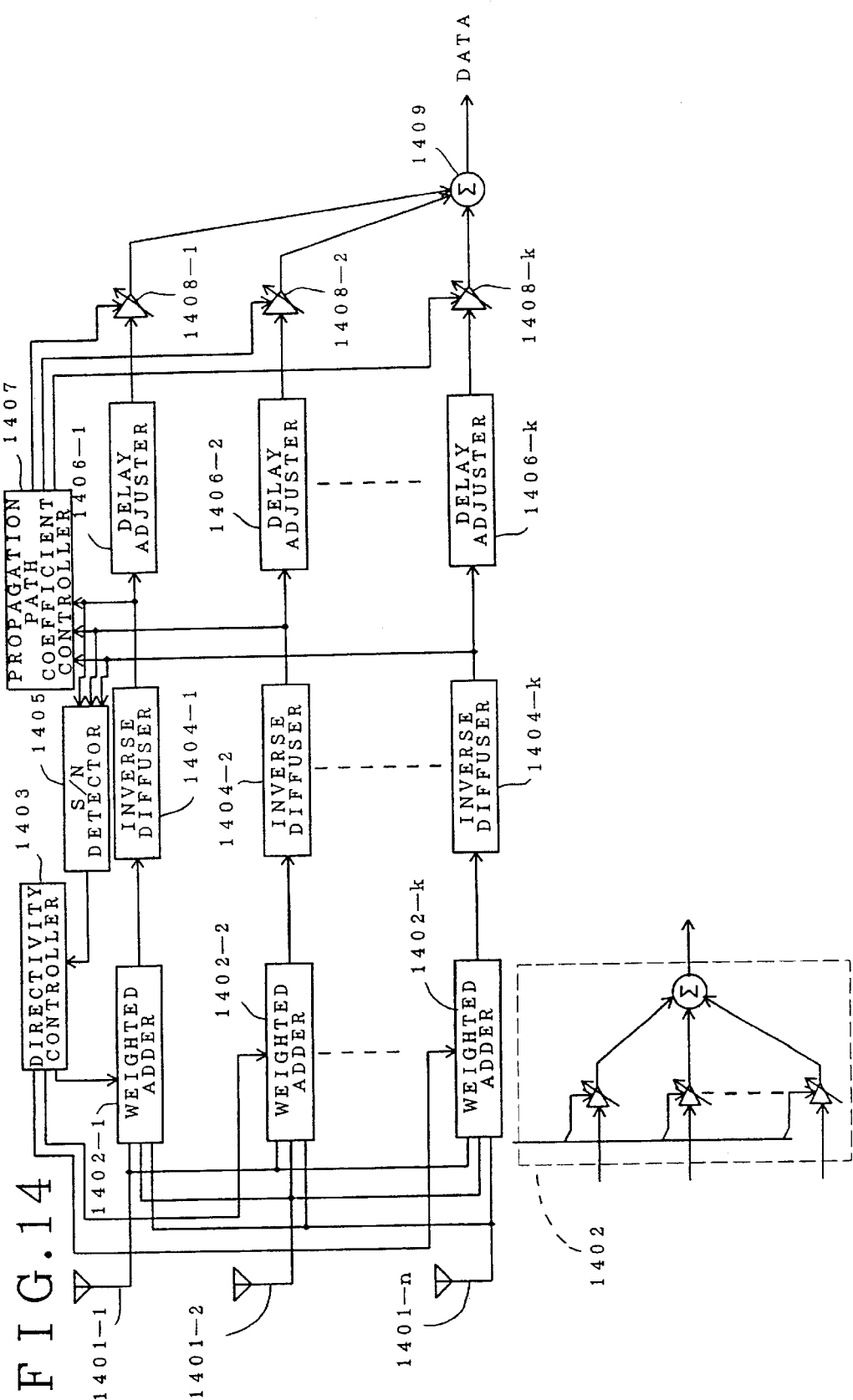
FIG. 14 is a block diagram of a spread spectrum radio transmission digital mobile communication device of a fourteenth embodiment of the present invention.

The spread spectrum radio transmission digital mobile communication device of the fourteenth embodiment of the invention comprises, as shown in FIG. 14, an S/N detector 1405 for detecting S/N ratio of output signal of each of inverse diffusers 1404-1 to 1404-k, and a directivity controller 1403 adjusts weighted adders 1402-1 to 1402-k based on output of the S/N detector 1405. The other arrangement is the same as in the device of the ninth embodiment.

In this device, the S/N detector 1405 obtains S/N ratio of output signal of the inverse diffusers 1404-1 to 1404-k for each of paths "m", and the directivity controller 1403 adjusts the weighted adders 1402-1 to 1402-k of each path so that the signal power to noise power ratio of each path in the output of the inverse diffusers 1404-1 to 1404-k is maximized and that main directions of "k" types of antenna directivity are not overlapped each other, and directivity to each path is controlled.

Therefore, in the spread spectrum radio transmission digital mobile communication device of the fourteenth embodiment, influence of co-channel interference wave and influence of delay wave are eliminated by the adaptive antenna for each path, as controlled to prevent overlapping of main directions of antenna directivity, under the condition that S/N ratio of signals after inverse diffusion is maximized.

(15th Embodiment)

Figure 15:
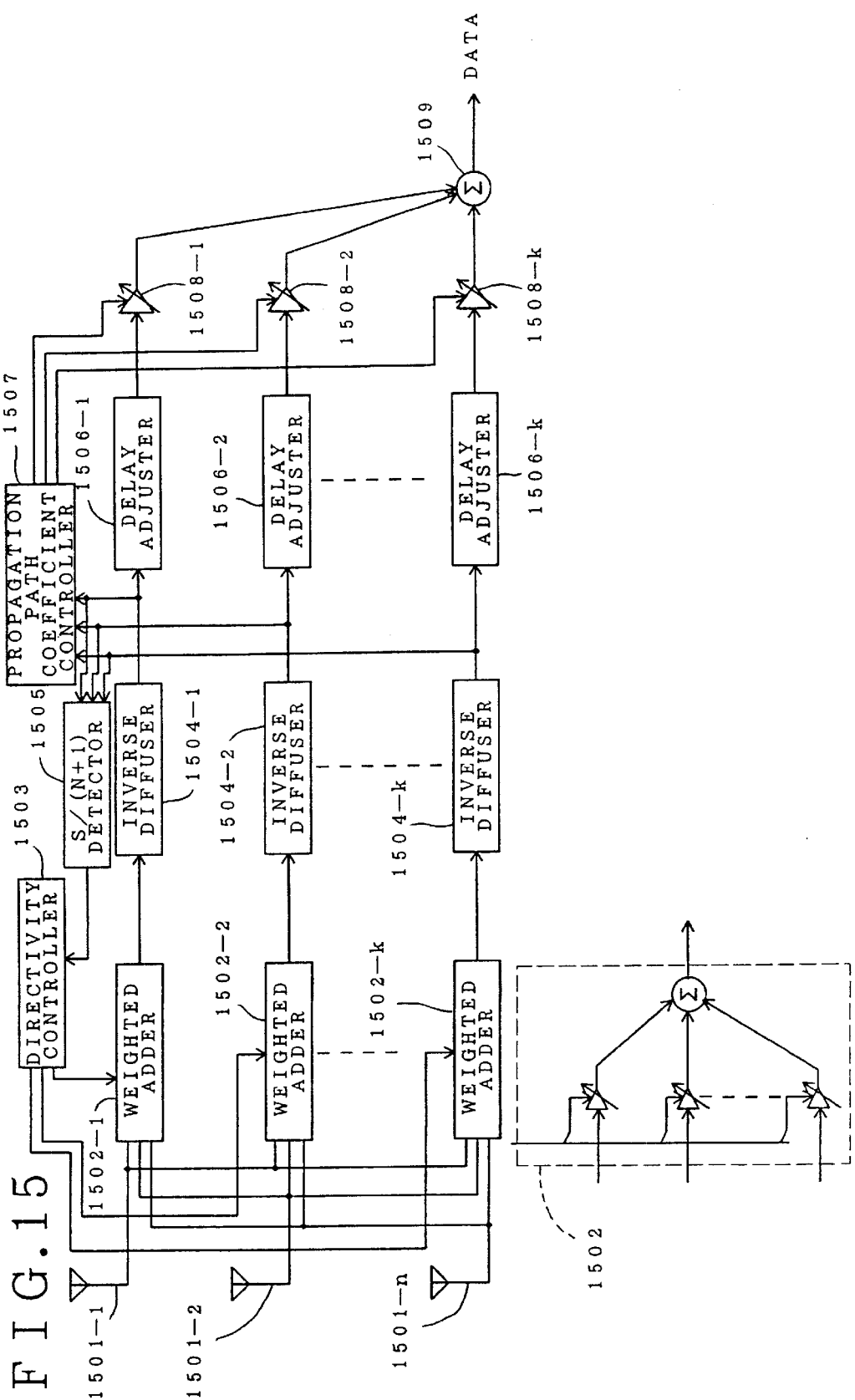
FIG. 15 is a block diagram of a spread spectrum radio transmission digital mobile communication device of a fifteenth embodiment of the present invention.

The spread spectrum radio transmission digital mobile communication device of the fifteenth embodiment of the invention comprises, as shown in FIG. 15, an S/(N+I) detector 1505 for detecting a signal power to (noise power+interference wave power) ratio of output signal of each of inverse diffusers 1504-1 to 1504-k, and a directivity controller 1503 adjusts weighted adders 1502-1 to 1502-k based on output of the S/(N+I) detector 1505. The other arrangement is the same as in the device of the ninth embodiment.

In this device, the S/(N+I) detector 1505 obtains the signal power to (noise power+interference wave power) ratio of output signal of the inverse diffusers 1504-1 to 1504-k for each of paths "m", and the directivity controller 1503 adjusts the weighted adders 1502-1 to 1502-k for each path so that signal power to (noise power+interference wave power) ratio of each path in the output of the inverse diffusers 1504-1 to 1504-k is maximized and that main directions of "k" (number) types of antenna directivity are not overlapped each other, and directivity to each path is controlled.

Therefore, in the spread spectrum radio transmission digital mobile communication device of the fifteenth embodiment, influence of co-channel interference wave and influence of delay wave are eliminated by the adaptive antenna for each path, as controlled to prevent overlapping of main directions of antenna directivity, under the condition that S/(N+I) ratio of the signals after inverse diffusion is maximized.

(16th Embodiment)

Figure 16:
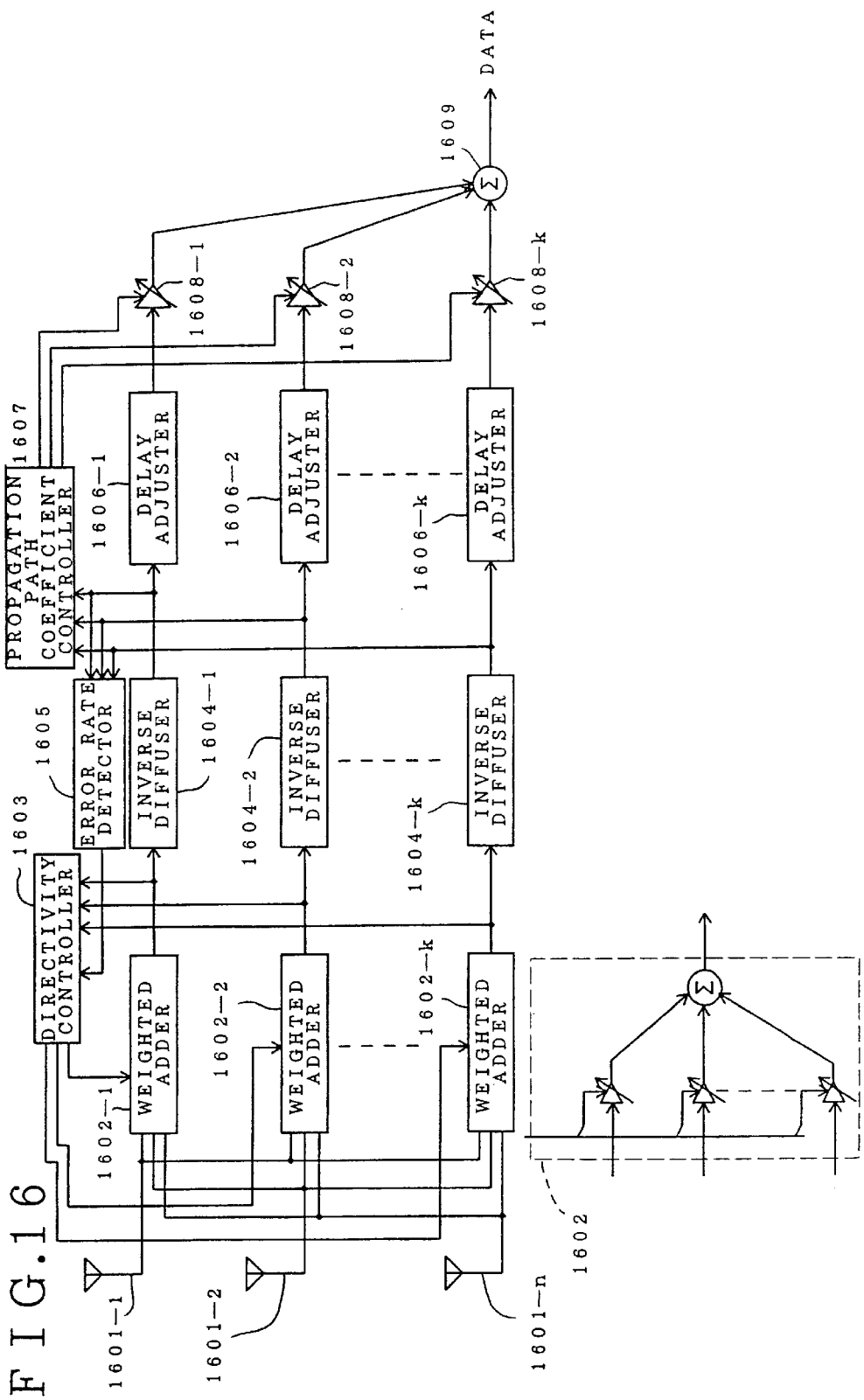
FIG. 16 is a block diagram of a spread spectrum radio transmission digital mobile communication device of a sixteenth embodiment of the present invention.

In the spread spectrum radio transmission digital mobile communication device of the sixteenth embodiment of the invention comprises, as shown in FIG. 16, a directivity controller 1603 adjusts weighted adders 1602-1 to 1602-k based on output of the weighted adders 1602-1 to 1602-k and on detection output of an error rate detector 1605. The other arrangement is the same as in the device of the thirteenth embodiment.

In this device, the directivity controller 1603 adjusts the weighted adders 1602-1 to 1602-k for each path so that influence of delay wave having delay time smaller than chip time width of diffusion signal in the output of the weighted adders 1602-1 to 1602-k is decreased, that error rate of each path is decreased to output of the inverse diffusers 1604-1 to 1604-k, and that main directions of "k" types of antenna directivity are not overlapped, and directivity corresponding to each path is controlled.

Therefore, in the spread spectrum radio transmission digital mobile communication device of the sixteenth embodiment of the invention, influence of delay wave having delay time smaller than chip time width and influence of co-channel interference wave are decreased in the output of the adaptive antenna and influence of co-channel interference wave and influence of delay wave are eliminated by the adaptive antenna for each path, as controlled to prevent overlapping of main directions of antenna directivity, under the condition that error rate of signals after inverse diffusion is minimized.

(17th Embodiment)

Figure 17:
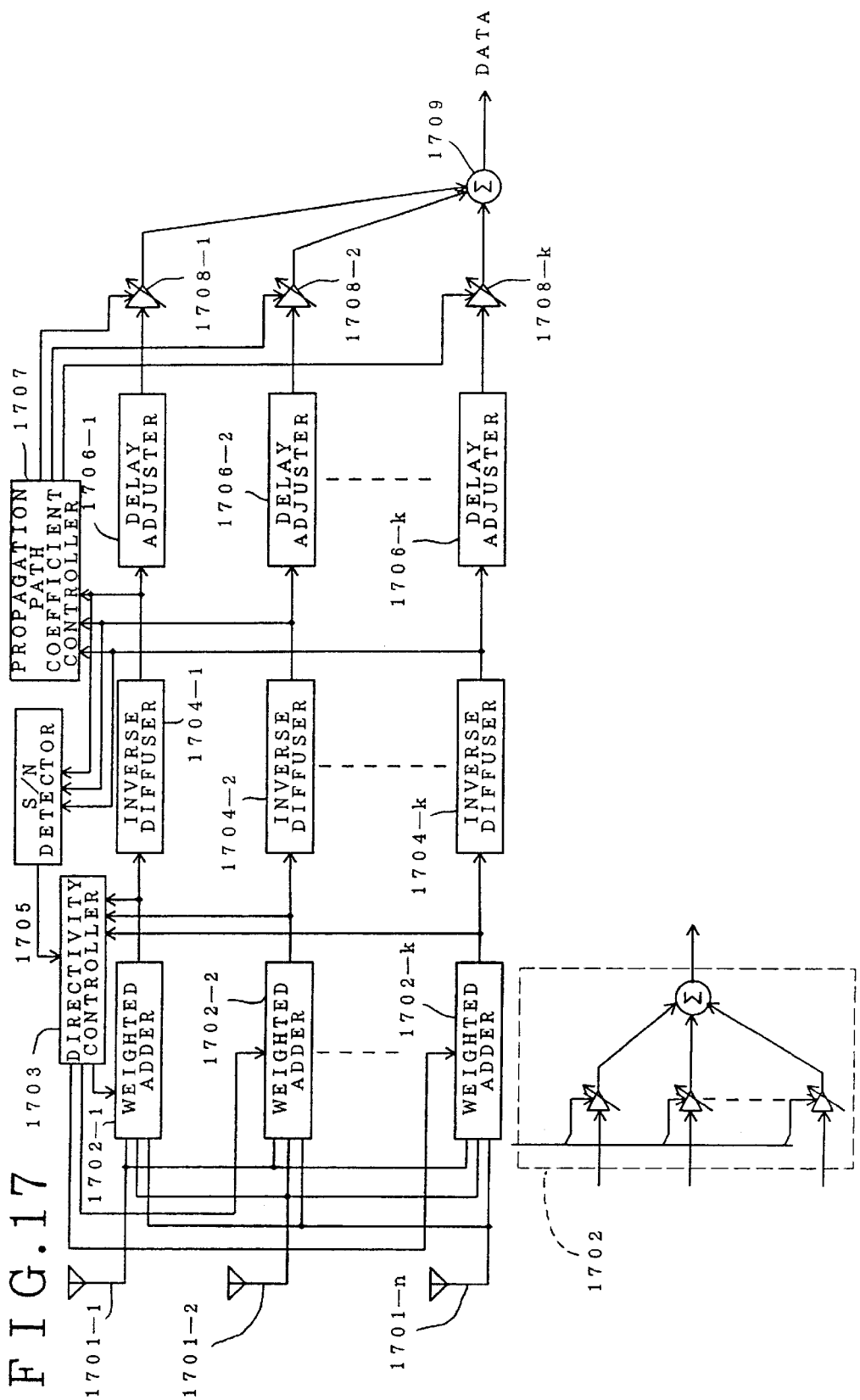
FIG. 17 is a block diagram of a spread spectrum radio transmission digital mobile communication device of a seventeenth embodiment of the present invention.

In the spread spectrum radio transmission digital mobile communication device of the seventeenth embodiment of the invention, as shown in FIG. 17, a directivity controller 1703 adjusts weighted adders 1702-1 to 1702-k based on output of the weighted adders 1702-1 to 1702-k and on detection output of the S/N detector 1705. The other arrangement is the same as in the device of the fourteenth embodiment.

In this device, the directivity controller 1703 adjusts the weighted adders 1702-1 to 1702-k for each path so that influence of delay wave having delay time smaller than chip time width of diffusion signal and influence of co-channel interference wave are decreased in the output of the weighted adders 1702-1 to 1702-k, that S/N ratio in each path to the output of the inverse diffusers 1704-1 to 1704-k is increased, and that main directions of "k" types of antenna directivity are not overlapped each other, and directivity corresponding to each path is controlled.

Therefore, in the spread spectrum radio transmission digital mobile communication device of the seventeenth embodiment, influence of delay wave having delay time smaller than chip time width in the output of the adaptive antenna and influence of co-channel interference wave are decreased and influence of co-channel interference wave and influence of delay wave are eliminated under the condition that S/N ratio of signals after inverse diffusion is increased by the adaptive antenna for each path, as controlled to prevent overlapping of main directions of antenna directivity.

(18th Embodiment)

Figure 18:
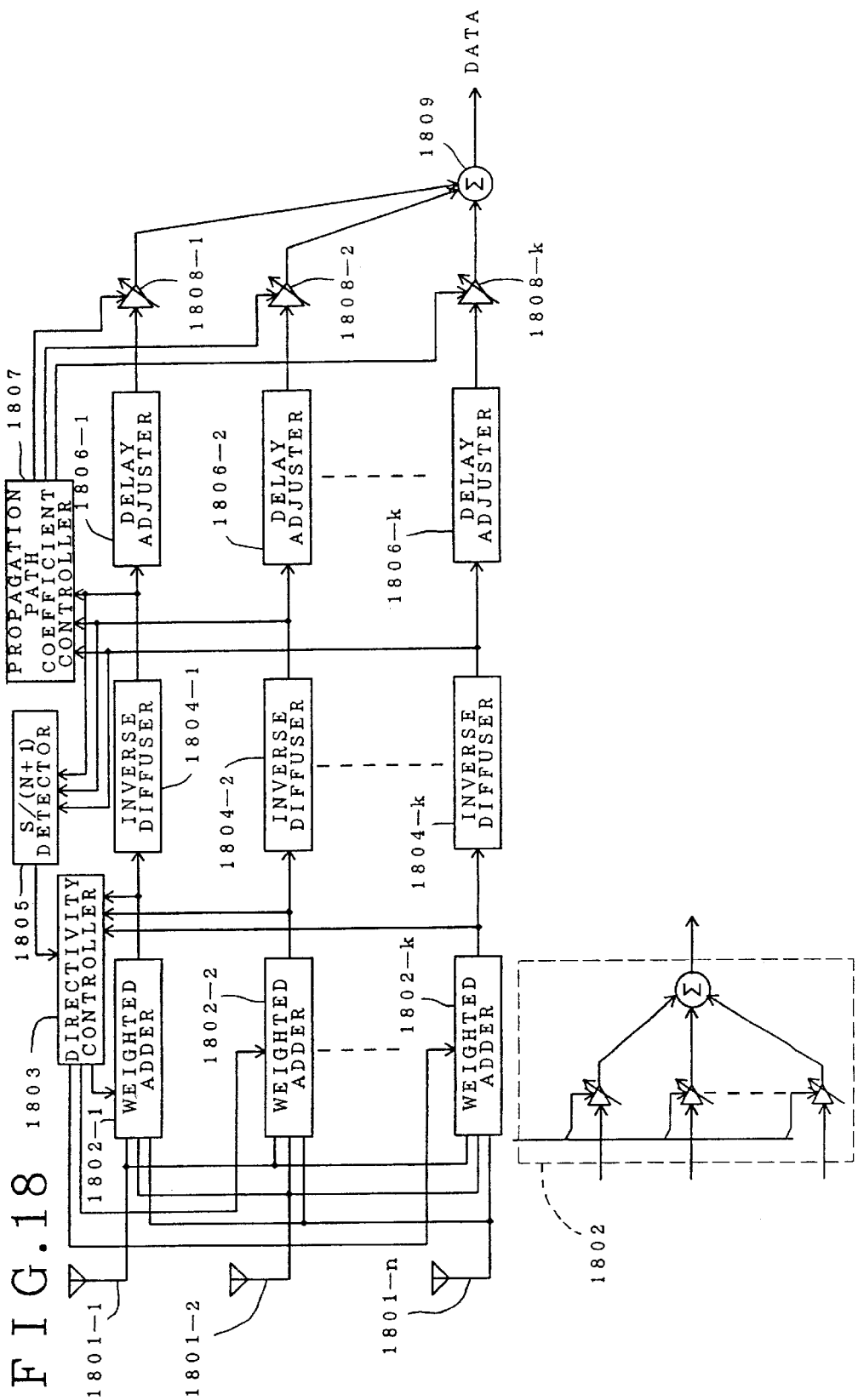
FIG. 18 is a block diagram of a spread spectrum radio transmission digital mobile communication device of an eighteenth embodiment of the present invention.

In the spread spectrum radio transmission digital mobile communication device of the eighteenth embodiment of the invention, as shown in FIG. 18, a directivity controller 1803 adjusts weighted adders 1802-1 to 1802-k based on the output of the weighted adders 1802-1 to 1802-k and on detection output of an S/(N+I) detector 1805. The other arrangement is the same as in the device of the fifteenth embodiment.

In this device, the directivity controller 1803 adjusts weighted adders 1802-1 to 1802-k for each path so that influence of delay wave having delay time smaller than chip time width of diffusion signal and influence of co-channel interference wave are decreased in the output of the weighted adders 1802-1 to 1802-k, that S/(N+I) ratio of each path to the output of the inverse diffusers 1804-1 to 1804-k is increased, and that main directions of "k" types of antenna directivity are not overlapped each other, and directivity corresponding to each path is controlled.

Therefore, in the spread spectrum radio transmission digital mobile communication device of the eighteenth embodiment of the invention, influence of delay wave having delay time smaller than chip time width and influence of co-channel interference wave are decreased in the output of the adaptive antenna, and influence of co-channel interference wave and interference of delay wave are eliminated by the adaptive antenna for each path, as controlled to prevent overlapping of main directions of antenna directivity, under the condition that S/(N+I) ratio of signals after inverse diffusion is increased.

(19th Embodiment)

Figure 19:
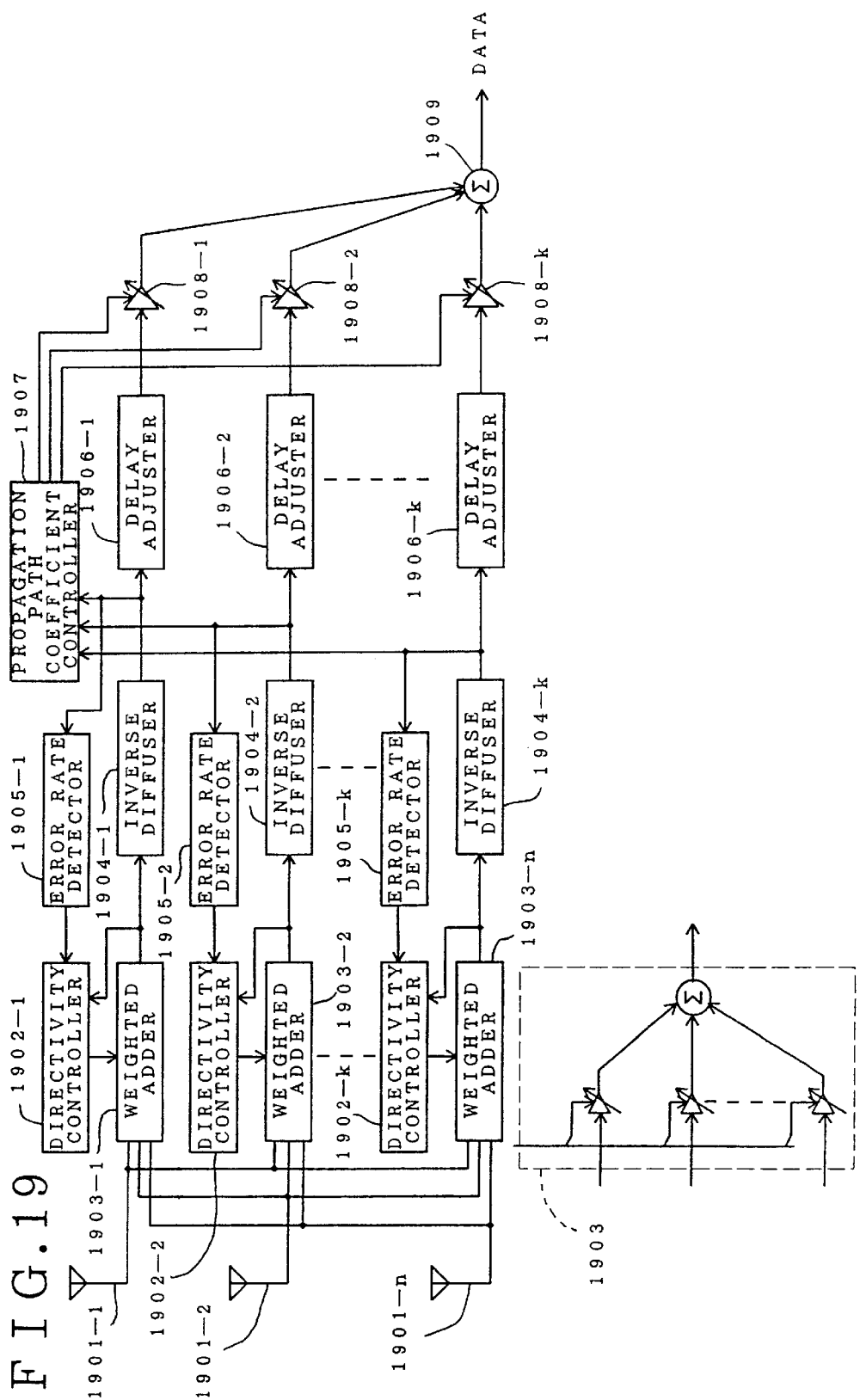
FIG. 19 is a block diagram of a spread spectrum radio transmission digital mobile communication device of a nineteenth embodiment of the present invention.

In the spread spectrum radio transmission digital mobile communication device of the nineteenth embodiment of the invention, as shown in FIG. 19, each of directivity controllers 1902-1 to 1902-k adjusts weighted adders 1903-1 to 1903-k based on output of the weighted adders 1903-1 to 1903-k and on detection output of error rate detectors 1905-1 to 1905-k. The other arrangement is the same as in the device of the tenth embodiment.

(20th Embodiment)

Figure 20:
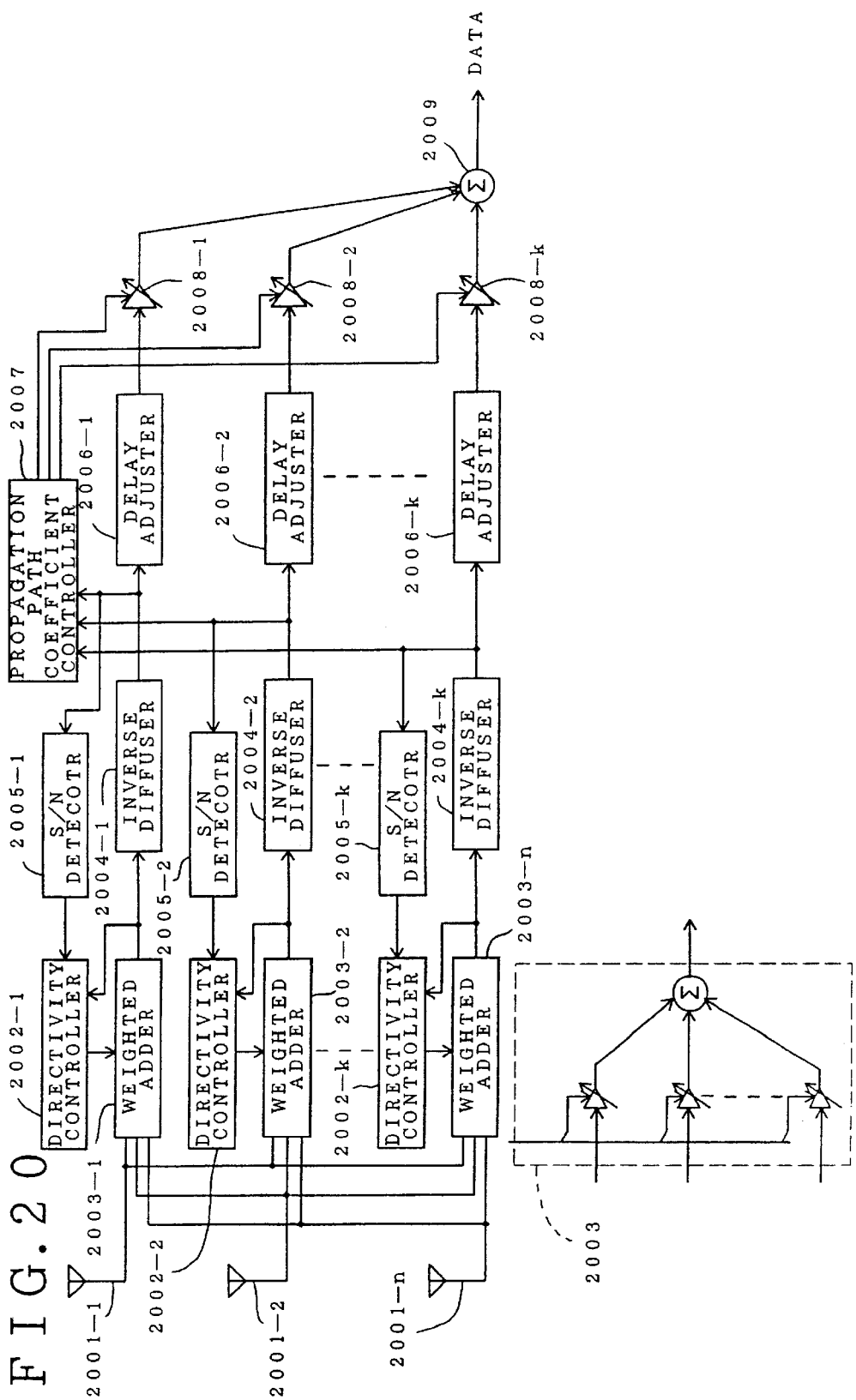
FIG. 20 is a block diagram of a spread spectrum radio transmission digital mobile communication device of a twentieth embodiment of the present invention.

In the spread spectrum radio transmission digital mobile communication device of the twentieth embodiment of the invention, as shown in FIG. 20, each of directivity controllers 2002-1 to 2002-k adjusts weighted adders 2003-1 to 2003-k based on output of the weighted adders 2003-1 to 2003-k and on detection output of S/N detectors 2005-1 to 2005-k. The other arrangement is the same as in the device of the eleventh embodiment.

(21st Embodiment)

Figure 21:
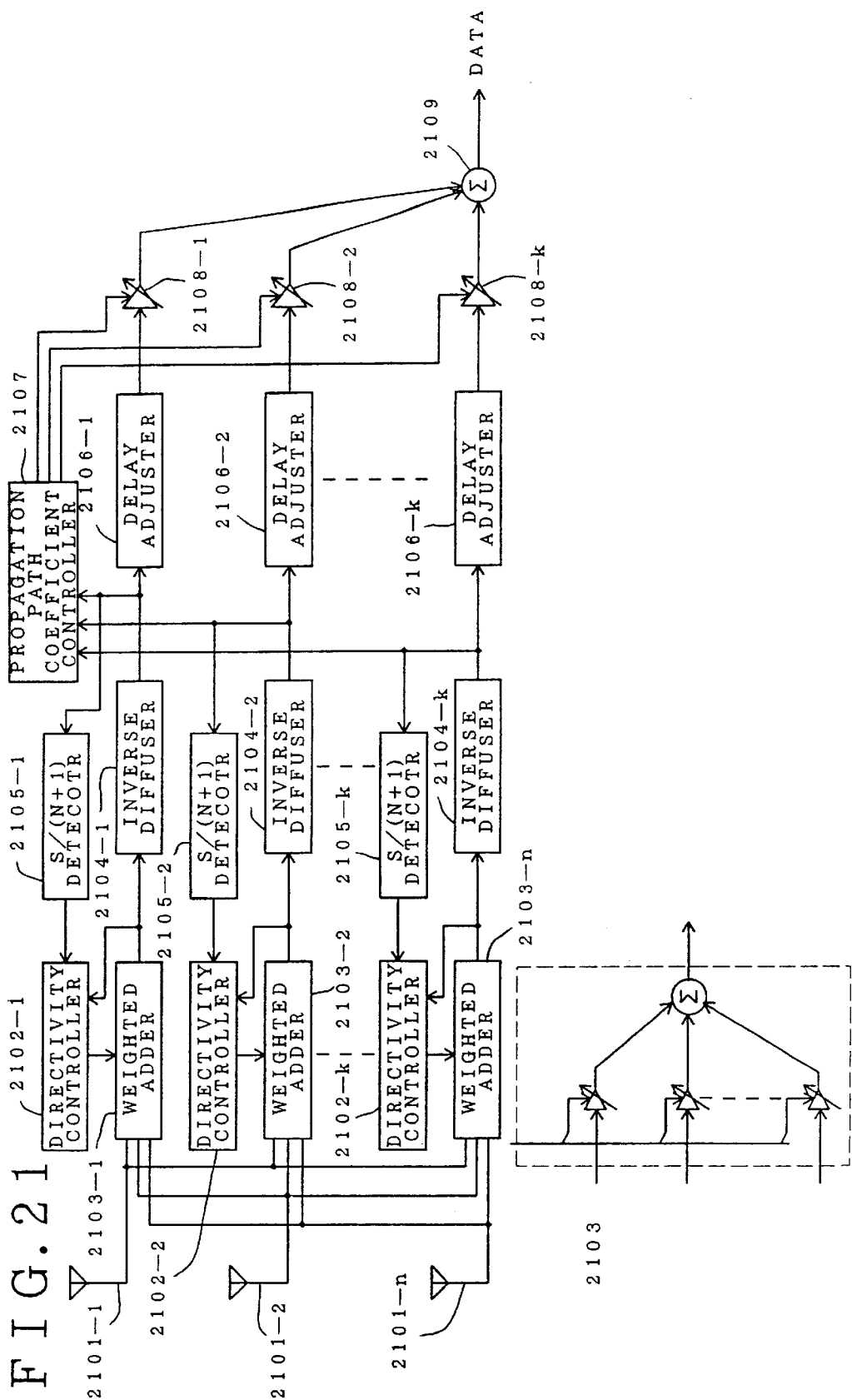
FIG. 21 is a block diagram of a spread spectrum radio transmission digital mobile communication device of a twenty first embodiment of the present invention.
Figure 22:
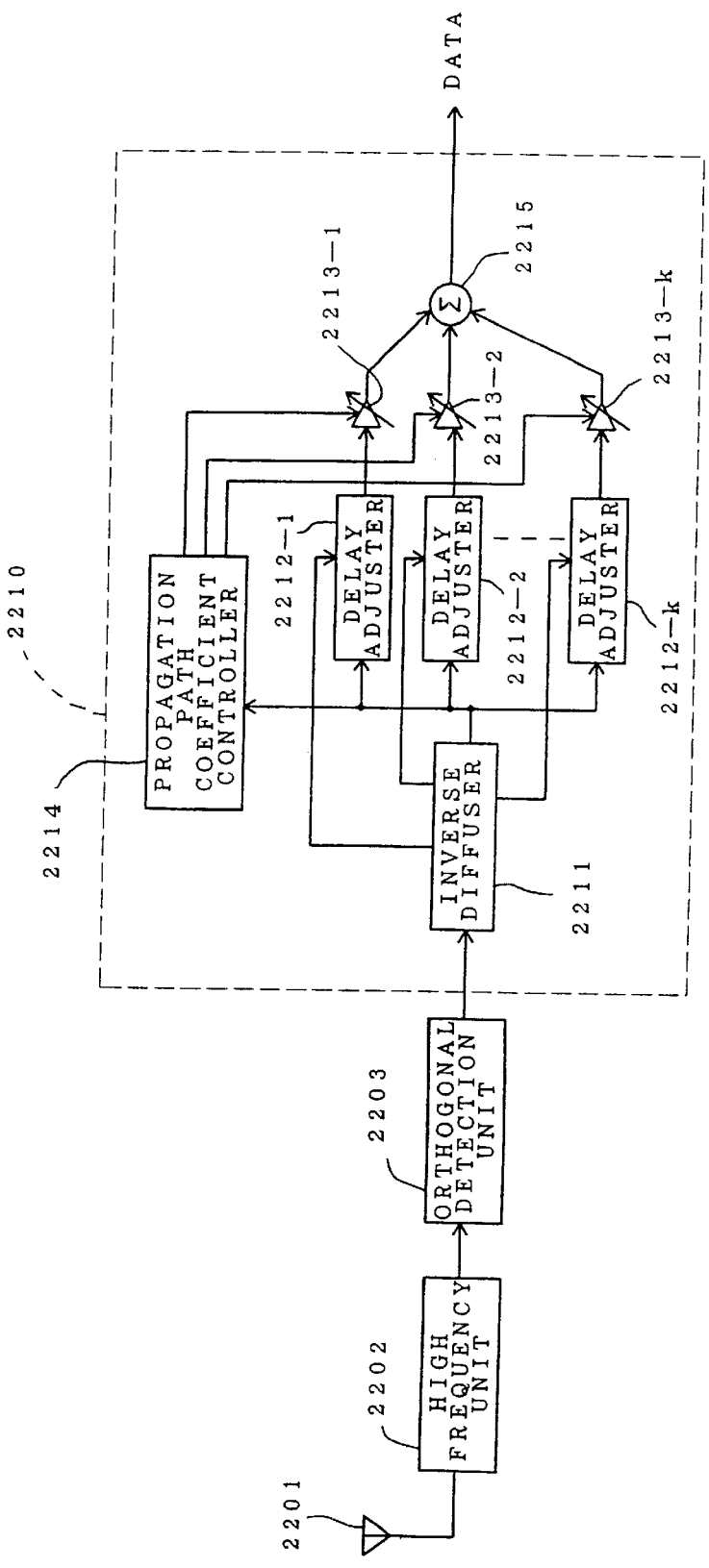
FIG. 22 is a block diagram of a conventional type spread spectrum radio transmission digital mobile communication device having RAKE receiving functions.

In the spread spectrum radio transmission digital mobile communication device of the twenty-first embodiment of the invention, as shown in FIG. 21, each of directivity controllers 2102-1 to 2102-k adjusts weighted adders 2103-1 to 2103-k based on output of the weighted adders 2103-1 to 2103-k and on detection output of S/(N+I) detectors 2105-1 to 2105-k. The other arrangement is the same as in the device of the twelfth embodiment.

As it is evident from the description of the above embodiments, it is possible according to the spread spectrum radio transmission digital mobile communication device of the present invention to decrease influence of delay wave having delay time smaller than chip time width of diffusion signal and influence of co-channel interference wave and to improve the receiving characteristics.

What is claimed is:

1. A spread spectrum radio transmission digital mobile communication device having RAKE receiving functions, comprising:

a plurality of variable gain amplifying means for adjusting amplification factor of signals received at each of a plurality of receiving branches at different spatial positions;

adding means for adding signals outputted from each of said variable gain amplifying means;

inverse diffusion means responsive to an output signal from said adding means for taking correlation of received signals and diffusion signals to perform inverse diffusion for said RAKE receiving functions thereby producing an inversely diffused signal;

synthesizing means responsive to output components of said inverse diffusion means for synthesizing paths by giving a delay time corresponding to each of said paths to said inversely diffused signal; and gain control means for controlling amplification factor of said plurality of variable gain amplifying means to decrease influence of delay wave having delay time smaller than chip time width of diffusion signal in the signals supplied to said inverse diffusion means.

2. A spread spectrum radio transmission digital mobile communication device according to claim 1, wherein path separation is performed on the signals inversely diffused by said inverse diffusion means, and said synthesizing means synthesizes paths by giving delay time corresponding to paths to each of the signals processed by path separation.

3. A spread spectrum radio transmission digital mobile communication device according to claim 2, wherein said gain control means controls amplification factor of said variable gain amplifying mean based on output signal of said adding means so that influence of delay wave having delay time smaller than chip time width of diffusion signal in said output signal is decreased.

4. A spread spectrum radio transmission digital mobile communication device according to claim 2, wherein there is provided error rate detecting means for detecting error rate of output of said synthesizing means and said gain control means controls amplification factor of said variable gain amplifying means to decrease said error rate.

5. A spread spectrum radio transmission digital mobile communication device according to claim 4, wherein said gain control means controls amplification factor of said variable gain amplifying means so that said error rate is reduced and influence of delay wave having delay time smaller than chip time width of diffusion signal in output signal of said adding means is decreased.

6. A spread spectrum radio transmission digital mobile communication device according to claim 2, wherein there is provided S/N detecting means for detecting a signal power to noise power ration of output of said synthesizing means, and said gain control means controls amplification factor of said variable gain amplifying means so that said signal power to noise power ration is increased.

7. A spread spectrum radio transmission digital mobile communication device according to claim 6, wherein said gain control means controls amplification factor of said variable gain amplifying means so that said signal power to noise power ratio is increased and that influence of delay wave having delay time smaller than chip time width of diffusion signal in output signal of said adding means is decreased.

8. A spread spectrum radio transmission digital mobile communication device according to claim 2, wherein there is provided S/(N+1) detecting means for detecting a signal power to (noise power+interference power) ratio of output of said synthesizing means, and said gain control means controls amplification factor f said variable gain amplifying means so that said signal power to (noise power+interference power) ratio is increased.

9. A spread spectrum radio transmission digital mobile communication device according to claim 8, wherein said gain control means controls amplification factor of said variable gain amplifying means so that said signal power to (noise power+interference power) ratio is increased and that influence of delay wave having delay wave having delay time smaller than chip time width of diffusion signal in output signal of said adding means is decreased.

10. A spread spectrum radio transmission digital mobile communication device according to claim 1, wherein there are provided a plurality of combinations of said variable gain amplifying means, said adding means for adding output signals of said variable gain amplifying means, and said inverse diffusion means where signals are inputted from said adding means, and said synthesizing means synthesizes paths by giving delay time corresponding to paths to each signal outputted from said inverse diffusion means.

11. A spread spectrum radio transmission digital mobile communication device according to claim 10, wherein said gain control means controls amplification factor of said variable gain amplifying means based on output signal of said adding means so that influence of delay wave having delay time smaller than chip time width of diffusion signal in said output signal is decreased.

12. A spread spectrum radio transmission digital mobile communication device according to claim 10, wherein there is provided error rate detecting means for detecting error rate of output of said inverse diffusion means, and said gain control means controls amplification factor of said variable gain amplifying means so that said error rate is reduced.

13. A spread spectrum radio transmission digital mobile communication device according to claim 12, wherein said gain control means controls amplification factor of said variable gain amplifying means so that said error rate is reduced and that influence of delay wave having delay time smaller than chip time width of diffusion signal in output signal of said adding means is decreased.

14. A spread spectrum radio transmission digital mobile communication device according to claim 10, wherein there is provided S/N detecting means for detecting a signal power to noise power ratio of output of said inverse diffusion means, and said gain control means controls amplification factor of said variable gain amplifying means so that said signal power to noise power ratio is increased.

15. A spread spectrum radio transmission digital mobile communication device according to claim 14, wherein said gain control means controls amplification factor of said variable gain amplifying means so that said signal power to noise power ratio is increased aid that influence of delay wave having delay time smaller than chip width of diffusion signal in the output signal of said adding means is decreased.

16. A spread spectrum radio transmission digital mobile communication device according to claim 10, wherein there is provided S/(N+1) detecting means for detecting a signal power to (noise power+interference power) ratio of output of said inverse diffusion means, and said gain control means controls amplification factor of said variable gain amplifying means so that said signal power to (noise power+interference power) ratio is increased.

17. A spread spectrum radio transmission digital mobile communication device according to claim 16, wherein said gain control means controls amplification factor of said variable gain amplifying means so that said signal power to (noise power+interference power) ratio is increased and influence of delay wave having delay time smaller than chip time width of diffusion signal in output signal of said adding means is decreased.

18. A spread spectrum radio transmission digital mobile communication device according to claim 10, wherein there are provided a plurality of said gain control means to match combination of said variable gain amplifying means, said adding means and said inverse diffusion means, and each of sad gain control means independently controls amplification factor of said variable gain amplifying means.

19. A spread spectrum radio transmission digital mobile communication device according to claim 10, wherein said gain control means is provided to match a plurality of combinations of said variable gain amplifying means, said adding means and said inverse diffusion means, add said gain control means controls amplification factor of said variable gain amplifying means in each of said combinations so that antenna directivity is dispersed.

* * * * *